US008213204B2

(12) United States Patent  
Lanni

(10) Patent No.: US 8,213,204 B2
(45) Date of Patent: Jul. 3, 2012

(54) MODULAR POWER ADAPTER

(75) Inventor: Thomas W. Lanni, Laguna Niguel, CA (US)

(73) Assignee: Comarco Wireless Technologies, Inc., Lake Forest, CA (US)

( * ) Notice: Subject to any disclaimer, the term of this patent is extended or adjusted under 35 U.S.C. 154(b) by 438 days.

(21) Appl. No.: 12/384,155

(22) Filed: Apr. 1, 2009

(65) Prior Publication Data

US 2010/0254162 A1    Oct. 7, 2010

(51) Int. Cl.
*H02M 1/10* (2006.01)
*H01R 13/44* (2006.01)

(52) U.S. Cl. ........................ 363/142; 439/131
(58) Field of Classification Search .................. 363/142, 363/146; 349/131, 638; 307/69, 72, 75; 439/131, 638
See application file for complete search history.

(56) References Cited

U.S. PATENT DOCUMENTS

| 339,103 A | 3/1886 | Hussey |
| 359,474 A | 3/1887 | Smith |
| 375,936 A | 1/1888 | Harwood |
| 1,741,265 A | 12/1929 | Wappler |
| 2,427,111 A | 9/1947 | Tolmie |
| 2,792,559 A | 5/1957 | Maberry |
| 3,048,805 A | 8/1962 | Berni |
| 3,049,687 A | 8/1962 | Berni |
| 3,111,641 A | 11/1963 | Wilentchik |
| 3,201,617 A | 8/1965 | Pacoroni et at. |
| 3,256,466 A | 6/1966 | Trolio et al. |
| 3,275,855 A | 9/1966 | Wright |
| 3,281,747 A | 10/1966 | Winsand |
| 3,452,215 A | 6/1969 | Alessio |
| 3,484,864 A | 12/1969 | Bernstein et al. |
| 3,581,480 A | 6/1971 | O'Connor et al. |
| 3,659,188 A | 4/1972 | Alexander et al. |
| 3,784,956 A | 1/1974 | Gassman |
| 3,870,946 A | 3/1975 | Sandorf |
| 3,996,546 A | 12/1976 | Hugly |
| 4,021,933 A | 5/1977 | Hughes |
| 4,083,246 A | 4/1978 | Marsh |
| 4,089,041 A | 5/1978 | Lockard |
| 4,116,524 A | 9/1978 | DeNigris et al. |
| 4,164,665 A | 8/1979 | Berger |
| 4,220,834 A | 9/1980 | Holce et al. |
| 4,239,319 A | 12/1980 | Gladd et al. |

(Continued)

FOREIGN PATENT DOCUMENTS

EP    1001513 A2    5/2000

(Continued)

OTHER PUBLICATIONS

Press Release of Empire Engineering, Electronic Design and Management, Jul. 5, 1995—San Luis Obispo, CA USA, pp. 1-2.

(Continued)

*Primary Examiner* — Matthew Nguyen
(74) *Attorney, Agent, or Firm* — Pillsbury Winthrop Shaw Pittman LLP

(57) ABSTRACT

A modular power adapter and method for using the same which increases the ease of a user's travel with portable electronic devices. The modular power adapter includes an output module which may be interchangeably and detachably coupled to DC input module or an AC input module. The output module and the input module are provided in separate housing structures thereby effectively spreading the heat dissipated from the modular power adapter.

13 Claims, 24 Drawing Sheets

U.S. PATENT DOCUMENTS

| | | | |
|---|---|---|---|
| 4,257,089 A | 3/1981 | Ravis | |
| 4,258,969 A | 3/1981 | Stallard | |
| 4,297,623 A | 10/1981 | Dupont | |
| 4,307,441 A | 12/1981 | Bello | |
| 4,442,382 A | 4/1984 | Fleck | |
| 4,569,009 A | 2/1986 | Genuit | |
| 4,622,627 A | 11/1986 | Rodriguez et al. | |
| 4,709,160 A | 11/1987 | Kinoshita | |
| 4,713,601 A | 12/1987 | Zahm et al. | |
| 4,713,642 A | 12/1987 | Wolfe et al. | |
| 4,734,839 A | 3/1988 | Barthold | |
| 4,747,034 A | 5/1988 | Dickey | |
| 4,829,224 A | 5/1989 | Gandelman et al. | |
| 4,860,185 A | 8/1989 | Brewer et al. | |
| 4,885,674 A | 12/1989 | Varga et al. | |
| 4,890,214 A | 12/1989 | Yamamoto | |
| 4,900,885 A | 2/1990 | Inumada | |
| 4,912,392 A | 3/1990 | Faulkner | |
| 4,924,067 A | 5/1990 | Wilhelmson | |
| 4,963,802 A | 10/1990 | Gross et al. | |
| 4,997,393 A | 3/1991 | Armando | |
| 5,006,695 A | 4/1991 | Elliott | |
| 5,007,863 A | 4/1991 | Xuan | |
| 5,019,954 A | 5/1991 | Bourgeault et al. | |
| 5,040,990 A | 8/1991 | Suman et al. | |
| 5,044,964 A | 9/1991 | Minerd et al. | |
| 5,084,666 A | 1/1992 | Bolash | |
| 5,089,768 A | 2/1992 | Sato | |
| 5,092,788 A | 3/1992 | Pristupa, Jr. et al. | |
| 5,127,844 A | 7/1992 | Leman et al. | |
| 5,146,394 A | 9/1992 | Ishii et al. | |
| 5,170,067 A | 12/1992 | Baum et al. | |
| 5,177,431 A | 1/1993 | Smith et al. | |
| 5,177,675 A | 1/1993 | Archer | |
| 5,181,859 A | 1/1993 | Foreman et al. | |
| 5,184,291 A | 2/1993 | Crowe et al. | |
| 5,233,509 A | 8/1993 | Ghotbi | |
| 5,245,220 A | 9/1993 | Lee | |
| 5,259,800 A | 11/1993 | Fields | |
| 5,290,191 A | 3/1994 | Foreman et al. | |
| 5,295,058 A | 3/1994 | McGreevy | |
| 5,309,348 A | 5/1994 | Leu | |
| 5,326,283 A | 7/1994 | Chen | |
| 5,333,177 A | 7/1994 | Braitberg et al. | |
| 5,347,211 A | 9/1994 | Jakubowski | |
| 5,369,352 A | 11/1994 | Toepfer et al. | |
| 5,412,248 A | 5/1995 | Murari et al. | |
| 5,414,610 A | 5/1995 | Brainard | |
| 5,428,288 A | 6/1995 | Foreman et al. | |
| 5,455,734 A | 10/1995 | Foreman et al. | |
| 5,471,117 A | 11/1995 | Ranganath et al. | |
| 5,479,331 A | 12/1995 | Lenni | |
| 5,510,691 A | 4/1996 | Palatov | |
| 5,532,524 A | 7/1996 | Townsley et al. | |
| 5,570,002 A | 10/1996 | Castleman | |
| 5,602,462 A | 2/1997 | Stich et al. | |
| 5,621,299 A | 4/1997 | Krall | |
| 5,636,110 A | 6/1997 | Lanni | |
| 5,648,712 A | 7/1997 | Hahn | |
| 5,672,951 A | 9/1997 | Shiota | |
| 391,227 A | 2/1998 | Dickey | |
| 5,714,805 A | 2/1998 | Lobaugh | |
| 5,715,153 A | 2/1998 | Lu | |
| 5,715,156 A | 2/1998 | Yilmaz et al. | |
| 5,731,693 A | 3/1998 | Furmanczyk | |
| 5,733,674 A | 3/1998 | Law et al. | |
| 5,739,672 A | 4/1998 | Lane | |
| 5,739,673 A | 4/1998 | Le Van Suu | |
| 5,770,895 A | 6/1998 | Kumasaka | |
| 5,773,961 A | 6/1998 | Cameron et al. | |
| 5,801,513 A | 9/1998 | Smith et al. | |
| 5,801,881 A | 9/1998 | Lanni et al. | |
| 5,822,200 A | 10/1998 | Stasz | |
| 5,838,110 A | 11/1998 | Pezzani | |
| 5,838,554 A | 11/1998 | Lanni | |
| 5,847,541 A | 12/1998 | Hahn | |
| 5,847,545 A * | 12/1998 | Chen et al. | 320/138 |
| 5,861,732 A | 1/1999 | Takimoto et al. | |
| 5,864,221 A | 1/1999 | Downs et al. | |
| 5,886,422 A | 3/1999 | Mills | |
| 5,901,056 A | 5/1999 | Hung | |
| 5,929,597 A | 7/1999 | Pfeifer et al. | |
| 5,949,213 A | 9/1999 | Lanni | |
| 5,977,747 A | 11/1999 | Huang | |
| 5,982,652 A | 11/1999 | Simonelli et al. | |
| 6,008,998 A * | 12/1999 | Han | 363/16 |
| 6,055,097 A | 4/2000 | Lanni et al. | |
| 6,064,177 A | 5/2000 | Dixon | |
| 6,071,156 A | 6/2000 | Platzer et al. | |
| 6,091,611 A | 7/2000 | Lanni | |
| 6,135,831 A | 10/2000 | Lanni et al. | |
| 6,137,280 A | 10/2000 | Ackermann et al. | |
| 6,152,792 A | 11/2000 | Lanni et al. | |
| 6,160,873 A | 12/2000 | Truong et al. | |
| 6,172,884 B1 | 1/2001 | Lanni | |
| 6,191,552 B1 | 2/2001 | Kates et al. | |
| 6,194,875 B1 | 2/2001 | Takimoto et al. | |
| 6,225,708 B1 | 5/2001 | Furukawa et al. | |
| 6,238,257 B1 | 5/2001 | Platzer et al. | |
| 6,266,261 B1 | 7/2001 | Lanni | |
| 6,297,972 B1 | 10/2001 | Chen | |
| 6,307,757 B1 | 10/2001 | Porter et al. | |
| 6,418,791 B1 | 7/2002 | Lanni et al. | |
| 6,456,184 B1 | 9/2002 | Vu et al. | |
| 6,473,961 B1 | 11/2002 | Segal et al. | |
| 6,504,343 B1 | 1/2003 | Chang | |
| 6,507,173 B1 | 1/2003 | Spiridon et al. | |
| 6,650,560 B2 | 11/2003 | MacDonald et al. | |
| 6,670,797 B2 | 12/2003 | Johanning | |
| 6,678,178 B2 | 1/2004 | Lipcsei | |
| 6,693,413 B1 | 2/2004 | Lanni | |
| 6,700,808 B2 | 3/2004 | MacDonald et al. | |
| 6,707,284 B2 | 3/2004 | Lanni | |
| 6,809,943 B2 | 10/2004 | Lanni | |
| 6,831,848 B2 | 12/2004 | Lanni | |
| 6,836,101 B2 | 12/2004 | Lanni | |
| 6,850,423 B2 | 2/2005 | Lanni | |
| 6,855,284 B2 | 2/2005 | Lanni et al. | |
| 6,922,347 B2 | 7/2005 | Lanni | |
| 6,937,490 B2 | 8/2005 | MacDonald | |
| 6,939,150 B1 | 9/2005 | Lanni | |
| 6,950,000 B1 | 9/2005 | Lanni et al. | |
| 7,035,126 B1 | 4/2006 | Lanni | |
| 7,053,742 B2 | 5/2006 | Lanni et al. | |
| 7,056,149 B1 | 6/2006 | Lanni | |
| 7,072,200 B2 | 7/2006 | Lanni | |
| 7,142,423 B2 | 11/2006 | Lanni | |
| 7,144,222 B2 | 12/2006 | Lanni | |
| 7,145,312 B2 | 12/2006 | Lanni | |
| 7,145,787 B2 | 12/2006 | Lanni | |
| 7,148,659 B2 | 12/2006 | Lanni | |
| 7,193,398 B2 | 3/2007 | Lanni | |
| 7,193,873 B2 | 3/2007 | Lanni | |
| 7,254,048 B2 | 8/2007 | Lanni | |
| 7,265,973 B2 | 9/2007 | Lanni | |
| 7,266,003 B2 | 9/2007 | Lanni | |
| 7,279,868 B2 | 10/2007 | Lanni | |
| 7,355,851 B2 | 4/2008 | Lanni | |
| 7,365,524 B2 | 4/2008 | Lanni | |
| 7,416,086 B2 | 8/2008 | Lanni | |
| 7,420,823 B2 | 9/2008 | Lanni | |
| 7,434,793 B2 | 10/2008 | Kunath et al. | |
| 7,450,390 B2 | 11/2008 | Lanni | |
| 7,450,403 B2 | 11/2008 | Lanni | |
| 7,453,171 B2 | 11/2008 | Lanni | |
| 7,460,381 B2 | 12/2008 | Lanni | |
| 7,489,116 B2 | 2/2009 | Lanni | |
| 7,495,941 B2 | 2/2009 | Lanni | |
| 7,529,110 B1 * | 5/2009 | Haines | 363/65 |
| 2001/0030879 A1 | 10/2001 | Greenfeld et al. | |
| 2002/0067630 A1 | 6/2002 | Tokunaga et al. | |
| 2002/0071290 A1 | 6/2002 | Youn et al. | |
| 2006/0007715 A1 | 1/2006 | MacDonald et al. | |
| 2007/0103836 A1 | 5/2007 | Oh | |

FOREIGN PATENT DOCUMENTS

| EP | 1107437 A2 | 6/2001 |
|---|---|---|
| EP | 1122873 A2 | 8/2001 |
| WO | WO 03/038980 A1 | 5/2003 |

OTHER PUBLICATIONS

Description of the "Smart Adapter System", Nesco Battery Systems, pp. 1-2.

Lu Carey: MacWorld "On the Road", vol. 12, No. 7, Jul. 1995, pp. 141-142, 5/9/1 (Item 1 from file: 15) Dialog(r) File 15:ABI/Inform(r).

Data Sheet for Benchmarq Model BQ2002C, Fast-Charge IC, Sep. 1997, 8 pgs.

Data Sheet for Benchmarq Model BQ2954, Lithium Ion Fast-Charge IC, Nov. 1997, 14 pgs.

"Portable Computers Fly High in the Sky with Airline Seat Power," [on-line], Nov. 18, 1996 [retrieved Feb. 13, 2001], pp. 1-2, retrieved from Internet: http://www.roadwarrior.com/xtend/news/pressurereleases/pr-961118.html.

"New PowerXtenders Adapter Lets Portable Computer Users Plug Into Computing Power on Airplanes and in Cars," [on-line], Apr. 30, 1997, [retrieved Feb. 13, 2001], pp. 1-3, retrieved from Internet: http://www.roadwarrior.com/xtend/news/pressurereleases/pr-970420.html.

Declaration of Ejaz Afzal in Oppoistion to Comarco's Motion for Preliminary Injunction, dated Apr. 30, 2003, 9 pgs. w/Exhibits 1-2 (attached).

Declaration of Ejaz Afzal in Support of Mobility Electronics, Inc.'s Motion for Summary Judgment, dated May 6, 2003, 10-pgs. w/Exhibits 1-2 (attached).

Declaration of of David Dickey in Support of Mobility Electronics, Inc.'s Motion for Summary Judgment, dated Jun. 2, 2003, 8-pgs. w/Exhibits 1-13 (attached).

Declaration of David Dickey in Opposition to Comarco's Motion for Preliminary Injunction, dated Jun. 2, 2003, 8-pgs. w/Exhibits 1-13 (attached).

IEEE Systems Readiness Technology Conference, Test Technology for the New Millennium, IEEE Catalog No. 99CH36323, Aug. 30-Sep. 2, 1999.

Comarco Wireless Technologies Power Products AC Adapter/Charger Program & Specification (5 pgs., 5th pg. dated Aug. 16, 1994).

Confidential Technical/Cost Proposal re: AC Power Adapter Prepared for IBM Corporation (19 pgs. 6th pg. dated Dec. 13, 1994).

Empire Engineering Confidential Disclosure Statement re: Universal Programmable DC Power Adapter dated Jan. 17, 1995; 3 pgs.

Nesco Battery Systems, SmartAdapter+ Model SA6-V21/30, 6 to 21 Volt DC Universal Adjustable DC Power Adapter Owner's Manual, 1999 (17 pgs.).

Xtend Micro Products, Inc., 50W DC Adapter Specification, Revision 1.01, (5 pgs.).

European Patent Office, "Extended European Search Report" re: Patent Application No. 10250631.8 of Comarco Wireless Technologies, Inc.; Issue Date: Mar. 28, 2012; 13 pages.

\* cited by examiner

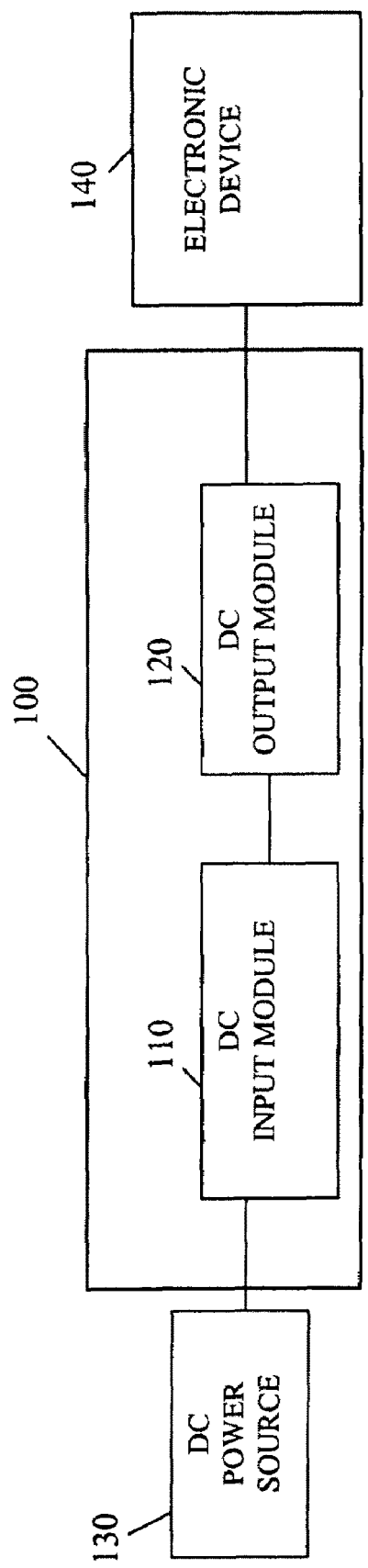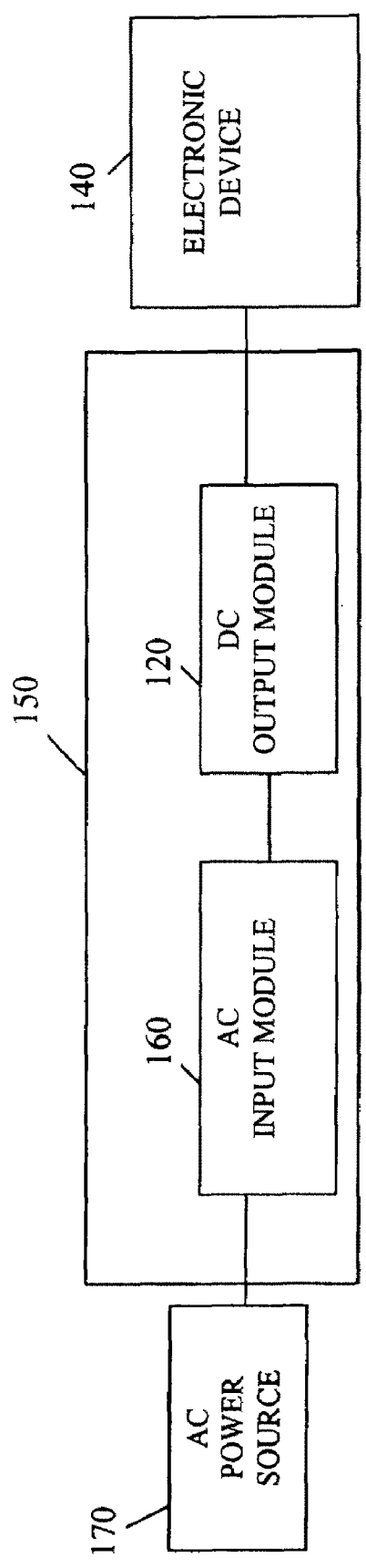

MODULAR POWER ADAPTER

BACKGROUND OF THE INVENTION

1. Field of the Invention

Embodiments of the present invention relate to a power adapter device and method for using the same. More specifically, the invention relates to a light weight, modular power adapter having a common module which connects to an electronic device and alternative modules which connect to the common module, depending on whether the source of power is AC or DC.

2. Description of Related Art

The popularity of portable electronic devices has grown exponentially. These portable electronic devices include laptop computers, handheld devices such as personal digital assistants (PDA), cellular telephones, digital cameras, audio recorders, Compact Disc (CD) players, MP3 players and portable digital video disc (DVD) players. Consumers often use such portable electronic devices at home, as well as in their cars, on airplanes, and at various travel destinations. While consumers are increasingly using such devices while in transit from one location to another, power constraints remain a limiting factor. Although, many of these devices are configured to operate using a battery source, often the battery life is insufficient and makes use of the device while in transit impractical.

On the other hand, conventional power adapters which support such use are bulky, heavy and cumbersome. In addition, conventional power adapters also frequently operate at high temperatures which results in a reduced life cycle for the adapters and increased expense associated with replacement costs.

Conventional power adapters are typically powered by AC only or on DC only. Accordingly, there is a need for a modular power adapter which works in both an AC mode and a DC mode. Further, there is a need for a modular power adapter, which is lightweight, less cumbersome, environmentally-friendly and has a lower operating temperature.

BRIEF SUMMARY OF THE INVENTION

The present invention is directed to a modular power adapter for providing a consumer- and environmentally-friendly connection between power source and portable electronics devices. It is an object of the present invention to improve the portability of electronics devices by modularizing the power adapter thereby reducing the weight of the adapter that must be carried. Another object of the invention is to distribute the heat dissipated by the modular power adapter, thus improving the lifespan of the power adapter when compared to conventional power adapters.

BRIEF DESCRIPTION OF THE DRAWINGS

FIGS. 1A and 1B are block diagrams of a modular power adapter according to an embodiment of the present invention.

DETAILED DESCRIPTION OF THE INVENTION

Figure 2A:
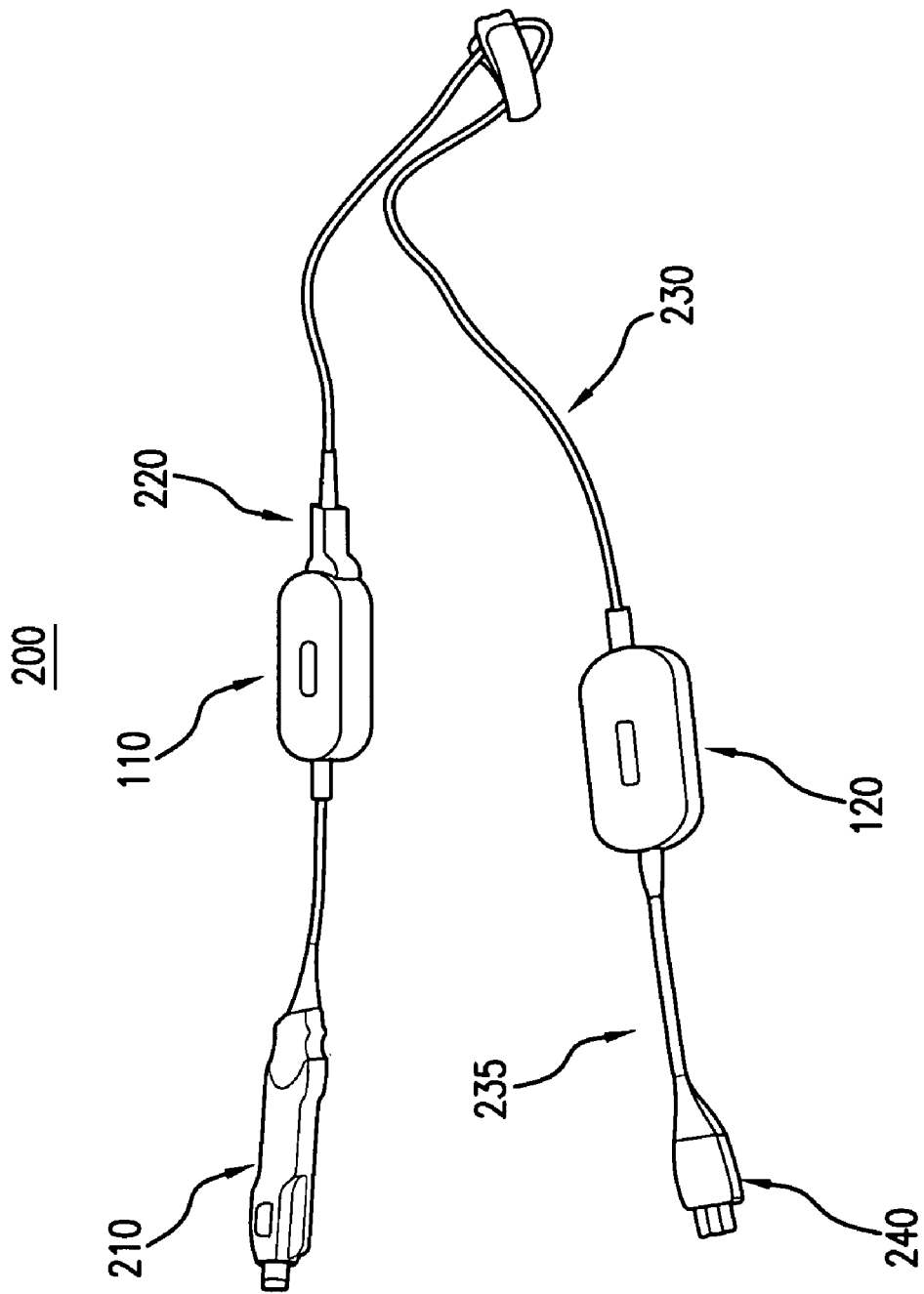
FIG. 2A is a perspective view of a modular power adapter configured in a DC mode according to an embodiment of the present invention.

FIG. 1A is a block diagram of a modular power adapter according to an embodiment of the present invention. As shown in FIG. 1A, modular power adapter 100 is configured in an DC mode and includes a DC input module 110. The modular power adapter 100 also includes a DC output module 120. The DC input module 110 may be configured with interface connectors (not shown) so as to be detachable from the DC power source 130 and also from the DC output module 120. The DC input module 110 receives DC power from DC power source 130 which may be a cigarette lighter socket, an airline in-seat adapter, an external battery or the like. The DC input module 110 generates a regulated DC voltage and provides the regulated DC voltage to the DC output module 120. The DC output module 120 may be detachably coupled to a portable electronic device portable electronic device 140 such as a laptop computer, a handheld device such as personal digital assistant (PDA), a cellular telephone, a digital camera, an audio recorder, a Compact Disc (CD) player, an MP3 player or a portable digital video disc (DVD) player. The DC output module 120 adjusts the regulated DC voltage to a level based on the power requirements of the portable electronic device 140 and outputs a voltage ($V_{OUT}$) to the portable electronic device 140.

FIG. 1B is a block diagram of a modular power adapter according to an embodiment of the present invention. As shown in FIG. 1B, modular power adapter 150 is configured in an AC mode and includes an AC input module 160. The modular power adapter 150 also includes the DC output module 120, which is also shown in FIG. 1A. That is, the DC output module 120 is common to both the AC and DC modes. The AC input module 160 may be configured with interface connectors (not shown) so as to be detachable from the AC power source 170 and also from the DC output module 120. The AC input module 160 receives AC power from AC power source 170 which may be configured as a wall outlet which may deliver 110V or 220V, for example. The AC input module 110 rectifies the AC voltage and generates a regulated DC voltage. The regulated DC voltage is provided to DC output module 120 which adjusts the regulated DC voltage to a level based on the power requirements of the electronic device 140 and outputs a voltage ($V_{OUT}$) to the portable electronic device 140. Preferably, the DC output module 120 is detachably coupled to the electronic device 140.

FIG. 2A is a perspective view of the modular power adapter 200, configured in a DC mode. The adapter 200 includes the DC input module 110 and the DC output module 120. The DC input module is configured with a cigarette lighter adapter 210 and an output jack (not shown) to receive an interface connector 220 on a cable 230 which is coupled to the input of the DC output module 120. The DC output module 120 is further configured with a second interface connector 240 on cable 235. The second interface connector 240 is configured to detachably couple to an input interface of a portable electronic device.

Figure 2B:
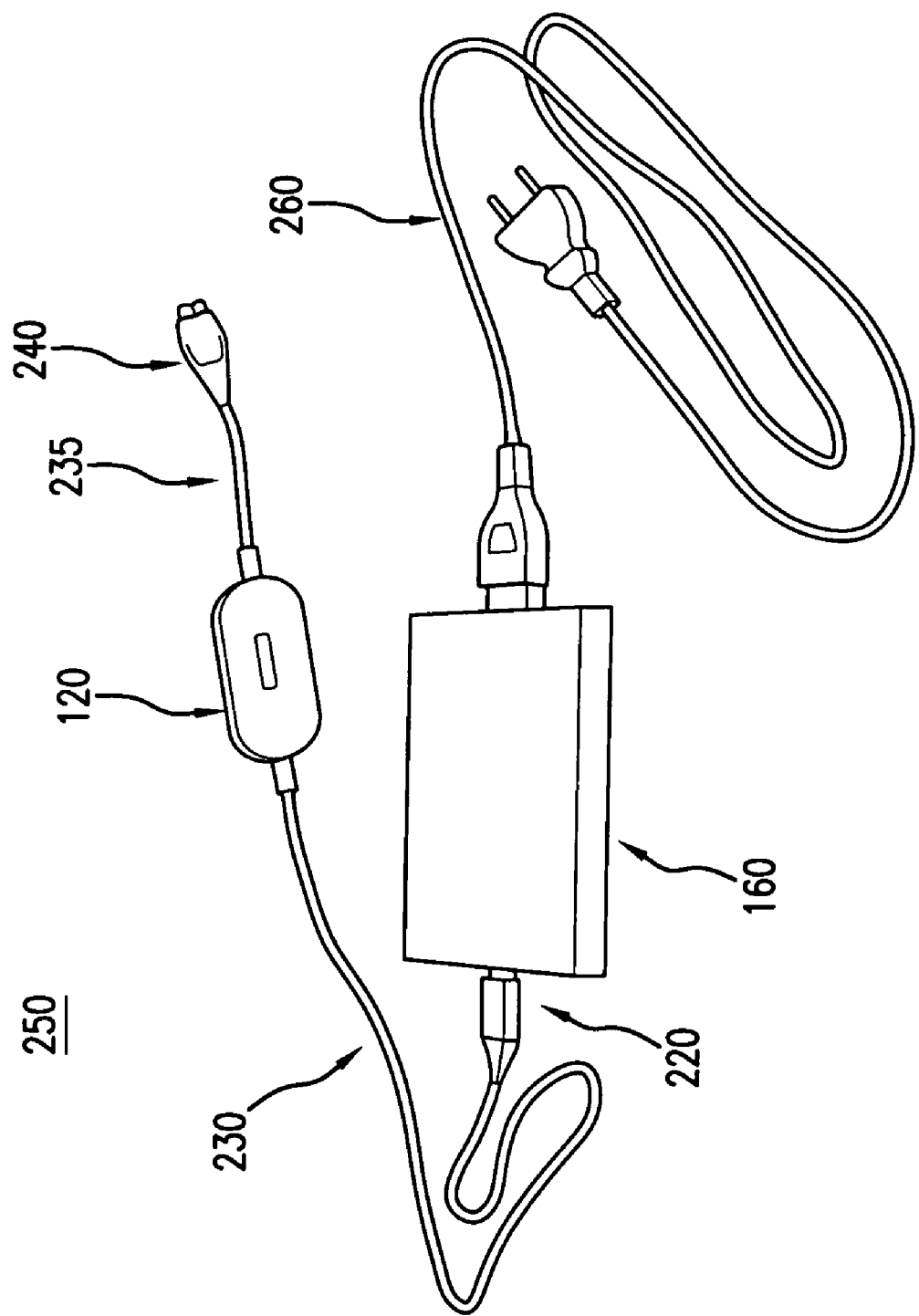
FIG. 2B is a perspective view of a modular power adapter configured in a AC mode according to an embodiment of the present invention.
Figure 3:
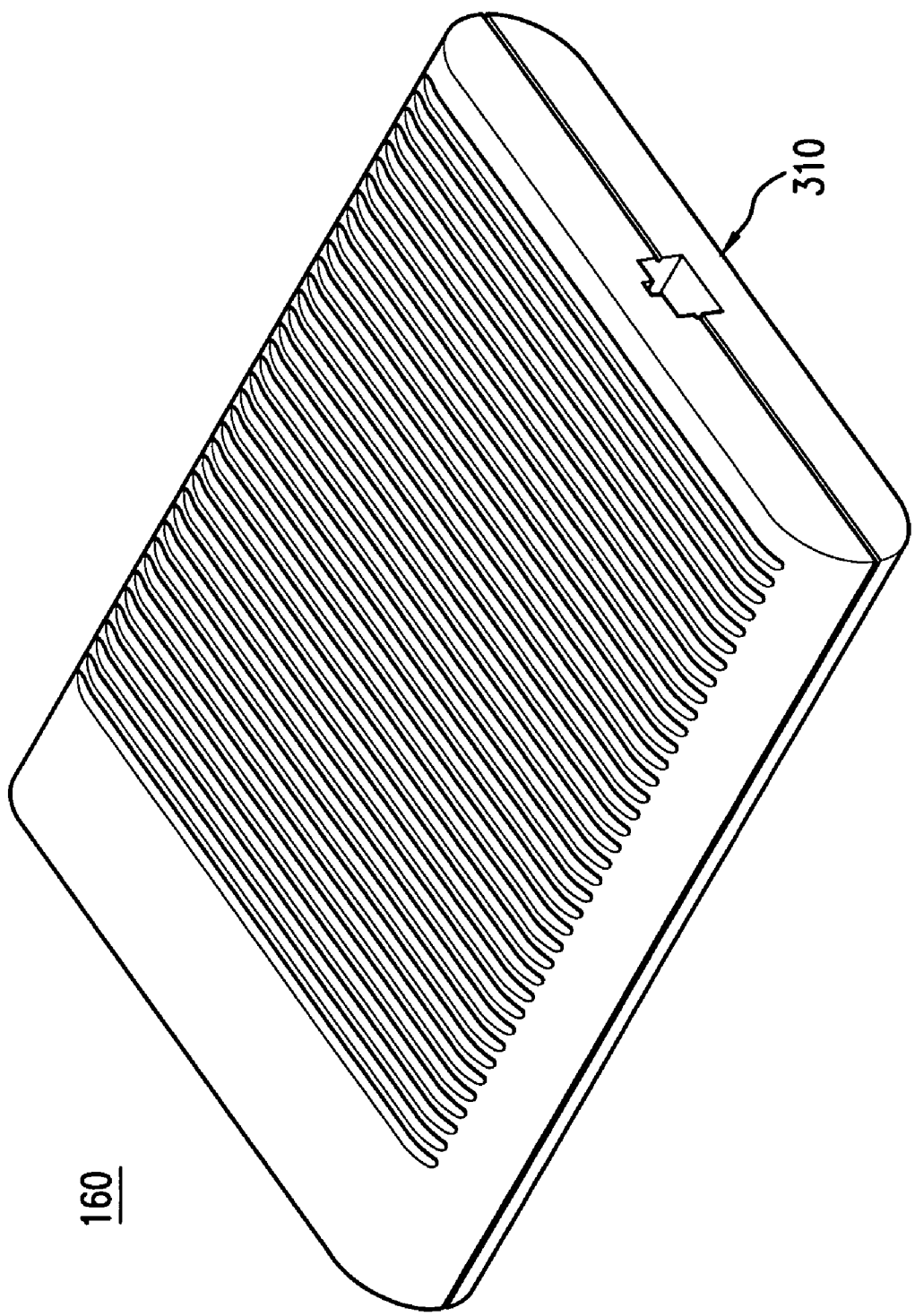
FIG. 3 is a perspective view of an AC input module of a modular power adapter according to an embodiment of the present invention.

On the other hand, FIG. 2B is a perspective view of the modular power adapter 250 configured in an AC mode. As shown in FIG. 2B, the DC input module 110 with cigarette lighter adapter 210 (of FIG. 2A) has been replaced by the AC input module 160 with an AC input power cord 260. Like the DC input module, the AC input module 160 is configured with an output jack (not shown) to receive interface connector 220 on cable 230 which is coupled to the input of the DC output module 120. In a preferred embodiment, the AC input module is configured as shown in FIG. 3. The AC input module may have dimensions of 95 mm×71 mm×15.5 mm.

As shown in FIGS. 1A, 1B, 2A, and 2B, the modular power adapter may be configured in a DC mode or an AC mode by interchangeably coupling the DC output module 120, which is common to both modes, to the either the DC input module 110 (FIGS. 1A and 2A) or the AC input module 160 (FIGS. 1B and 2B). This feature allows a user, for example, to use a laptop computer with a modular power adapter according to an embodiment of the present invention in the DC mode while traveling in a car by connecting the cigarette lighter adapter 210 to a cigarette lighter socket in the car and coupling the interface connector 240 to the laptop computer. If the user returns home or reaches a travel destination and wishes to continue working on the laptop computer in the AC mode, the user may simply disconnect the interface connector 220 from the DC input module 110 and leave the DC input module in the car connected to the cigarette lighter socket for later use. With the DC output module still connected to the portable electronic device, the user may connect AC input cord 260 to a wall outlet and couple interface connector 220 to AC input module 160.

On the other hand, if the user wants to switch back to DC mode, the user may disconnect the interface connector 220 from the AC input module 160. The AC input module 160, which is larger in size than the DC input module 110, may be disconnected from the wall outlet and packed away in a travel bag, for example. The DC input module may be reconnected as described above. As such, by using the modular power adapter of the present invention, the user may easily switch from one power source to another with a single disconnect/connect cycle.

As shown in FIGS. 1-3, the DC output module 120 is provided in a housing structure separate from the DC input module 110 and the AC input module 160. Thus, the power conversion performed by the modular power adapter is spread across the selected input module and the DC output module. Accordingly, the modular power adapter according to the present invention distributes the heat produced by the modular power adapter. This increases the lifecycle of the modular power adapter as compared to conventional power adapters. This also makes the modular power adapter safer than conventional power adapters since it lessens the likelihood of heating the area around the adapter and lessens the likelihood of the user being burned when touching the modular power adapter.

Figure 4:
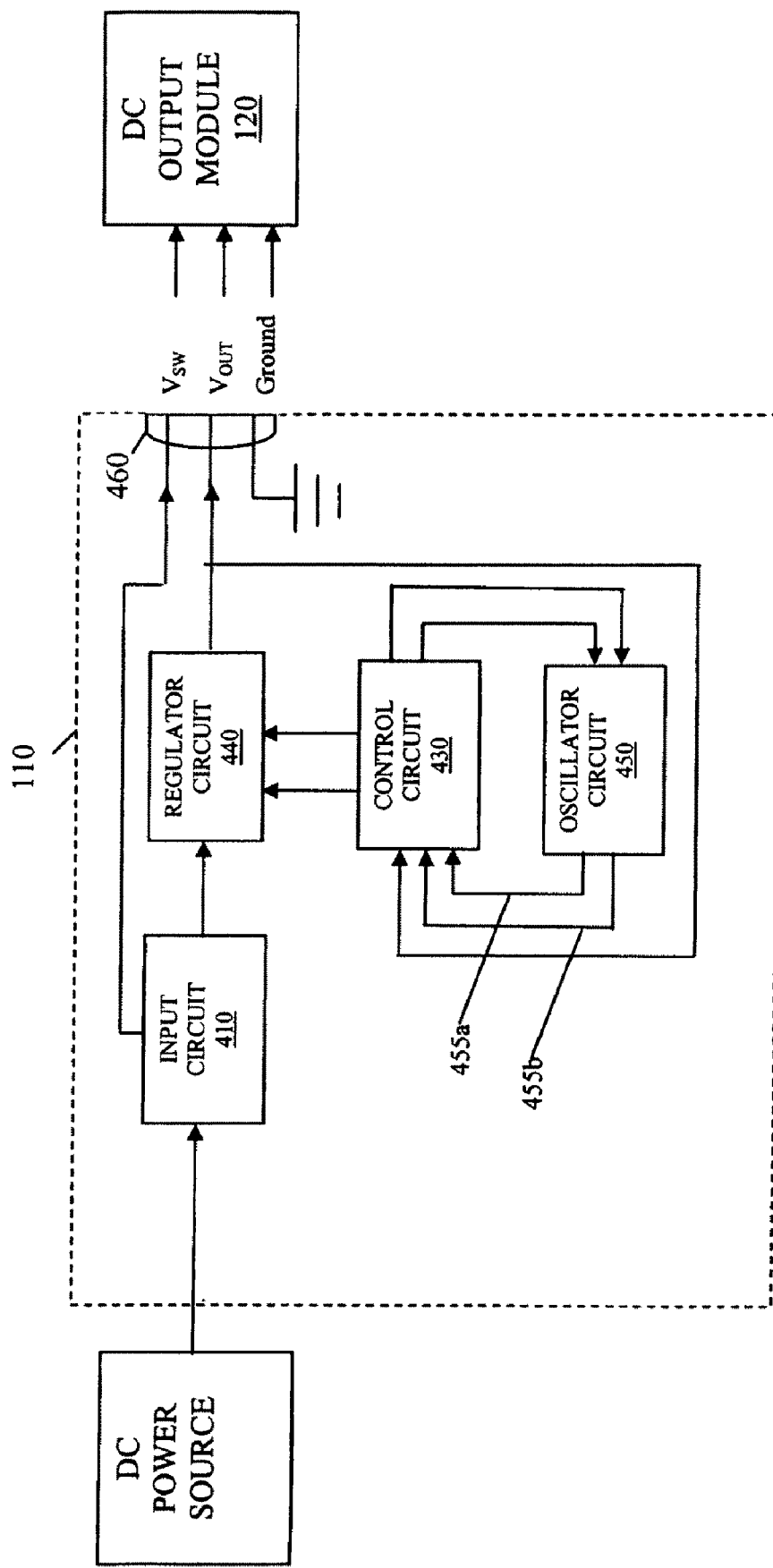
FIG. 4 is a block diagram of a DC input module of the modular power adapter according to an embodiment of the present invention.

FIG. 4 is a block diagram of a DC input module 110 of a modular power adapter according to an embodiment of the present invention. Referring to FIG. 4, DC input module 110 may include an input circuit 410, a control circuit 430, a regulator circuit 440 and an oscillator circuit. The input circuit 410 may receive DC power from a DC power source which may be, for example, a cigarette lighter socket of an automobile or an airplane in-seat adapter capable of outputting about 12V of DC power. The input circuit 410 provides the DC voltage to the control circuit 430 and regulator circuit 440. Oscillator circuit 450 generates a pair of triangle waves which are supplied to control circuit 430. The output of the regulator circuit ($V_{OUT}$) is provided to control circuit 430 via a feedback path and used to set the duty cycle for the control circuit 430. Based on the output voltage $V_{OUT}$ in comparison to the triangle waves (455$a$ and 455$b$) the control circuit 430 drives the regulator to increase or decrease the output voltage of the regulator to produce a regulated DC voltage $V_{OUT}$ of about 32 V. The regulated DC voltage $V_{OUT}$ may be output via output interface jack 460 along with a reference voltage $V_{SW}$ of about 10V, and ground.

Figure 5:
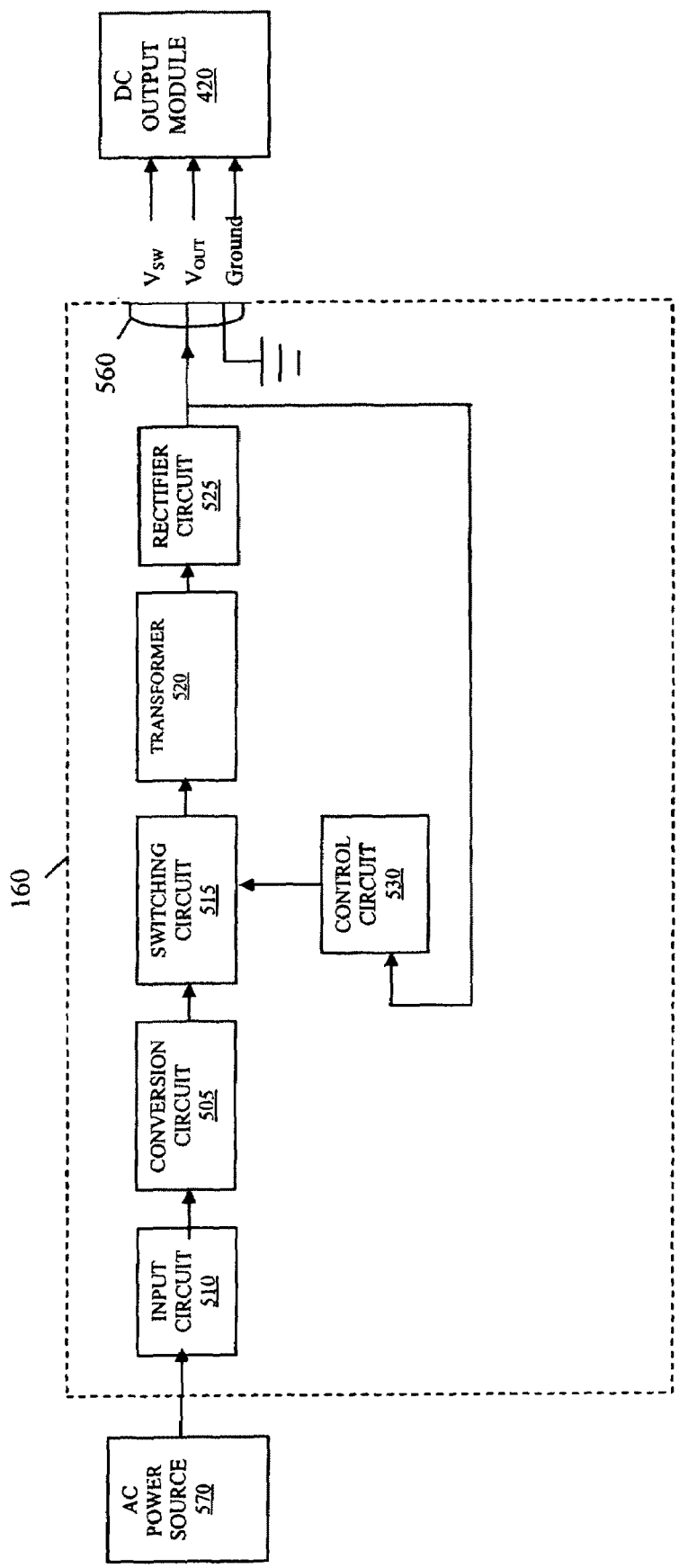
FIG. 5 is a block diagram of an AC input module of a modular power adapter according to an embodiment of the present invention.

FIG. 5 is a block diagram of the AC input module 160 of a modular power adapter according to an embodiment of the present invention. As shown in FIG. 5, AC input module 160 may include an input circuit 510, conversion circuit 505, a switching circuit 515, a transformer 520, a rectifier circuit 525, and a control circuit 530. The input circuit 510 may be configured to receive AC power from an AC power source such as a wall outlet which may output 110V or 220V of AC power, for example. The input circuit 510 provides the received AC power to the conversion circuit 505 which may be configured as a full wave rectifier or a half wave rectifier. The conversion circuit 505 converts the AC voltage to a DC voltage. The DC voltage is then supplied to the switching circuit 515. The switching circuit 515 produces an AC voltage which is provided to the rectifier circuit 525 via transformer 520 under the control of control circuit 530. The rectifier circuit 525 converts the AC voltage to a regulated DC voltage (shown as $V_{OUT}$) of approximately 32V. A different voltage level could be used according to design preference. The regulated DC output voltage $V_{OUT}$ is then output to DC output module 120 via an output interface jack 560 and also fed back to control circuit 530 and used to produce a steady state voltage output. A reference voltage $V_{SW}$ of approximately 10V and ground may also be provided via output interface jack 560.

The AC input module may also include output filters to reduce noise in the output and thus provide a more stable power output. Further, the AC input module may include a protection circuit to protect against overheating or undervoltage conditions, for example.

Figure 6:
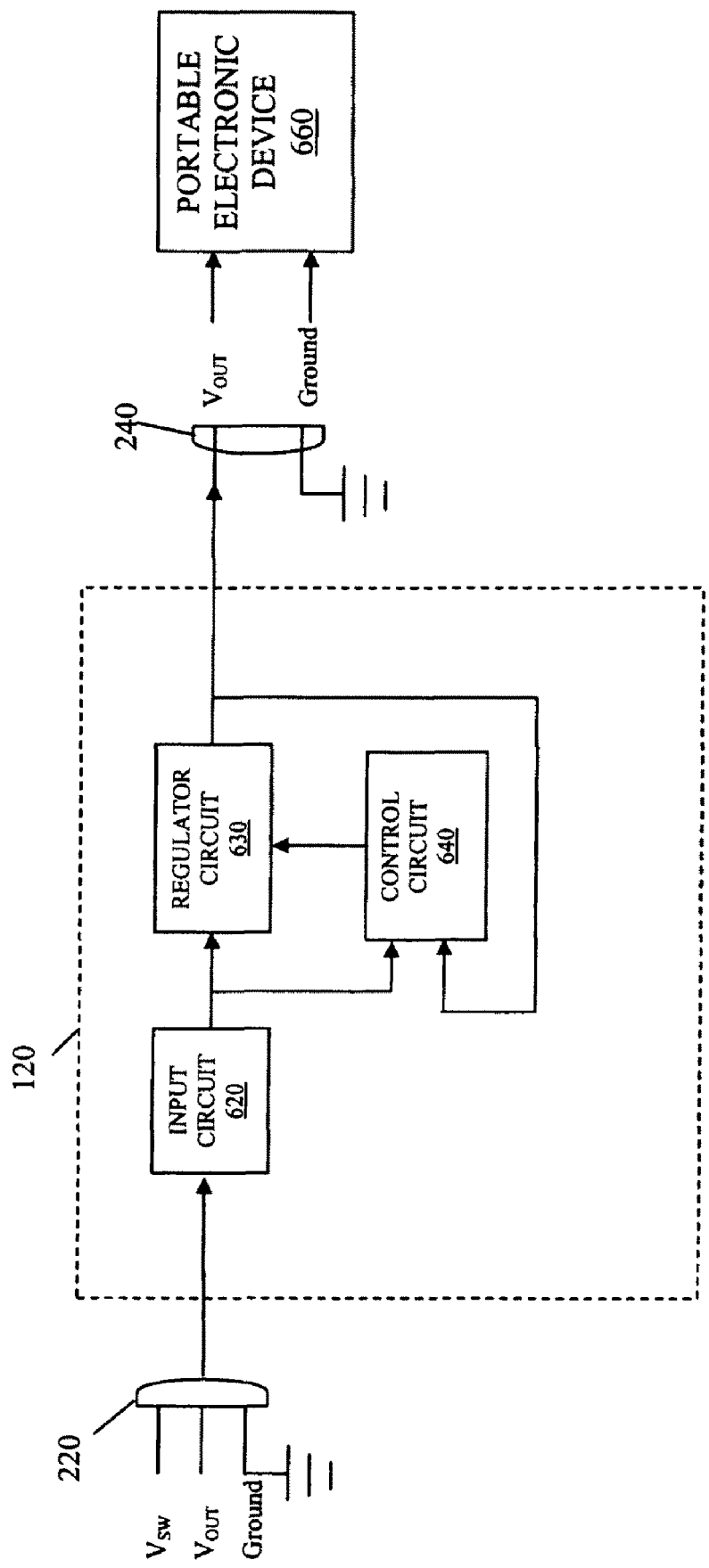
FIG. 6 is a block diagram of a DC Output Module of the modular power adapter according to an embodiment of the present invention.

FIG. 6 is a block diagram of the DC output module 120 of a modular power adapter according to an embodiment of the present invention. The DC output module 120 includes the interface connector 220, input circuit 620, a regulator circuit 630, a control circuit 640 and the output interface connector 240. Interface connector 220 is configured to mate with the output interface jack of the DC input module 110 or the AC input module 160. Input circuit 640 receives power supplied by either the DC input module 110 or the AC input module 160 via interface connector 220. Control circuit 640 monitors the output voltage which varies as the load of an electronic device 660 varies. The electronic device 660 is coupled to the output interface connector 240 of the DC output module 120.

Based on the sensed voltage, control circuit 640 controls the regulator circuit 630 to output an output voltage at a stable level required to operate the electronic device 660.

The DC output module 120 may further be configured with a protection circuit to prevent damage to components of the modular power adapter, the electronic device coupled thereto, and the consumer as a result of overheating.

Figure 7:
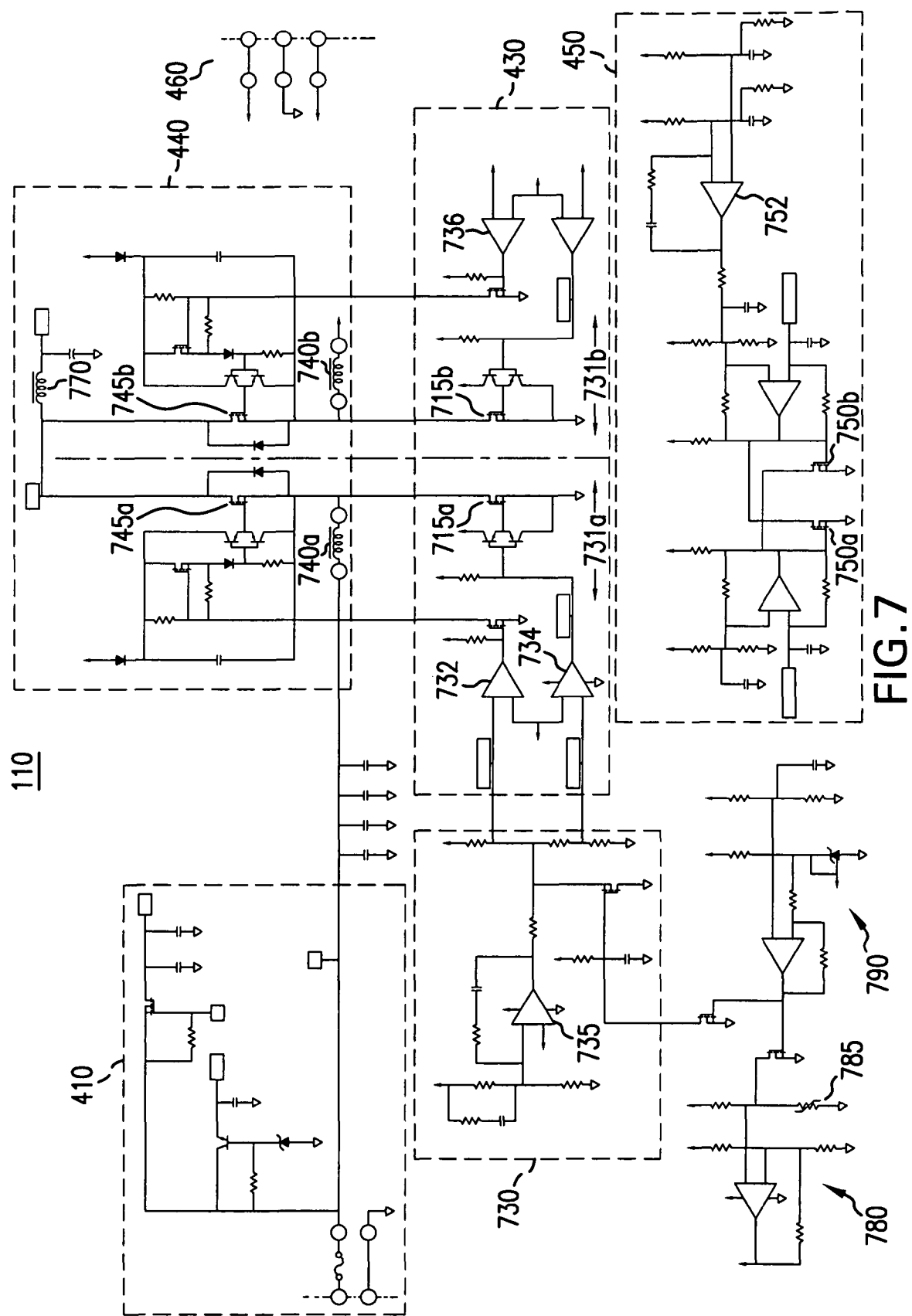
FIGS. 7-7D are schematic diagrams illustrating the DC input module of the modular power adapter according to an embodiment of the present invention.
Figure 7A:
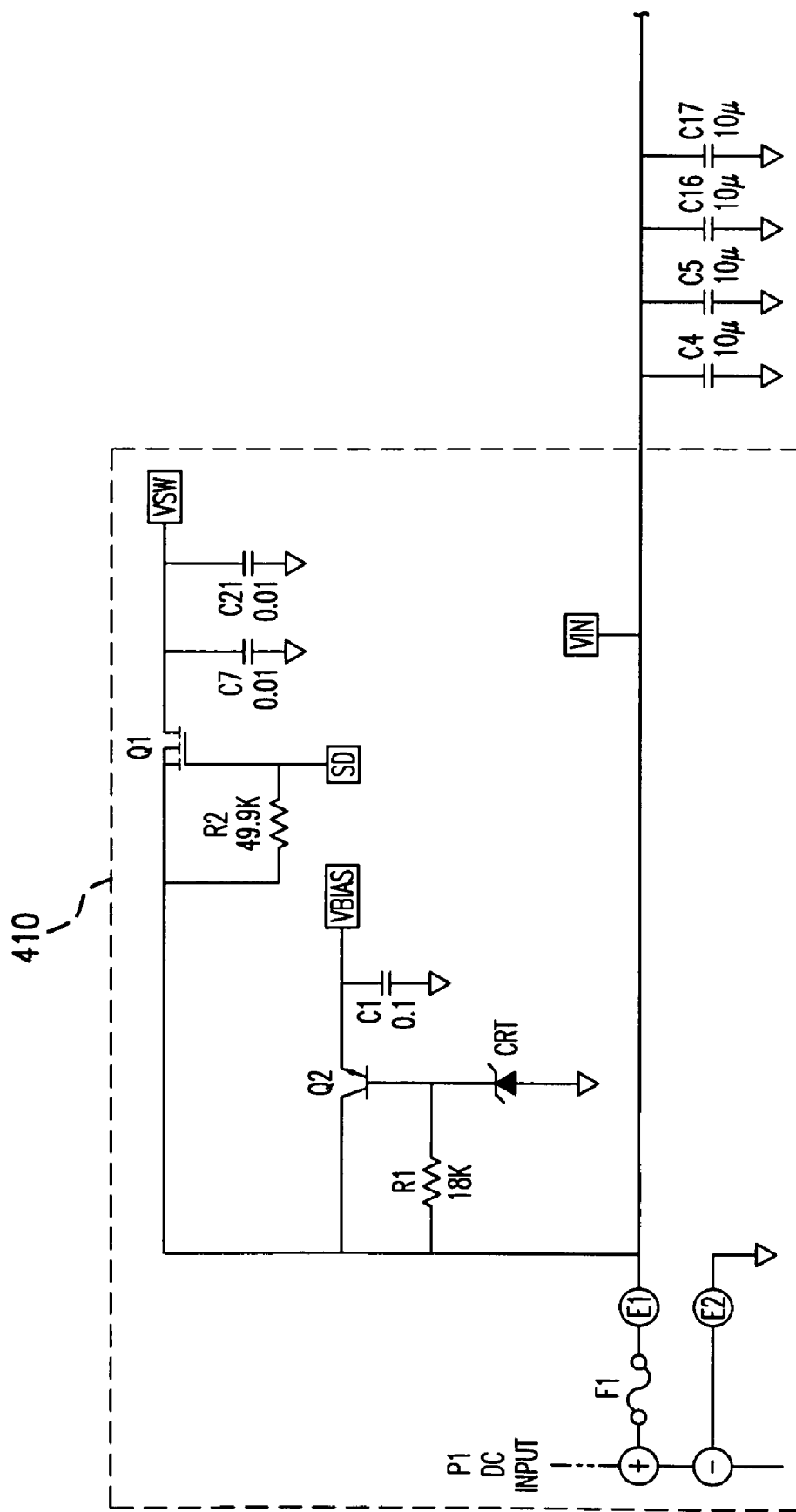
Figure 7B:
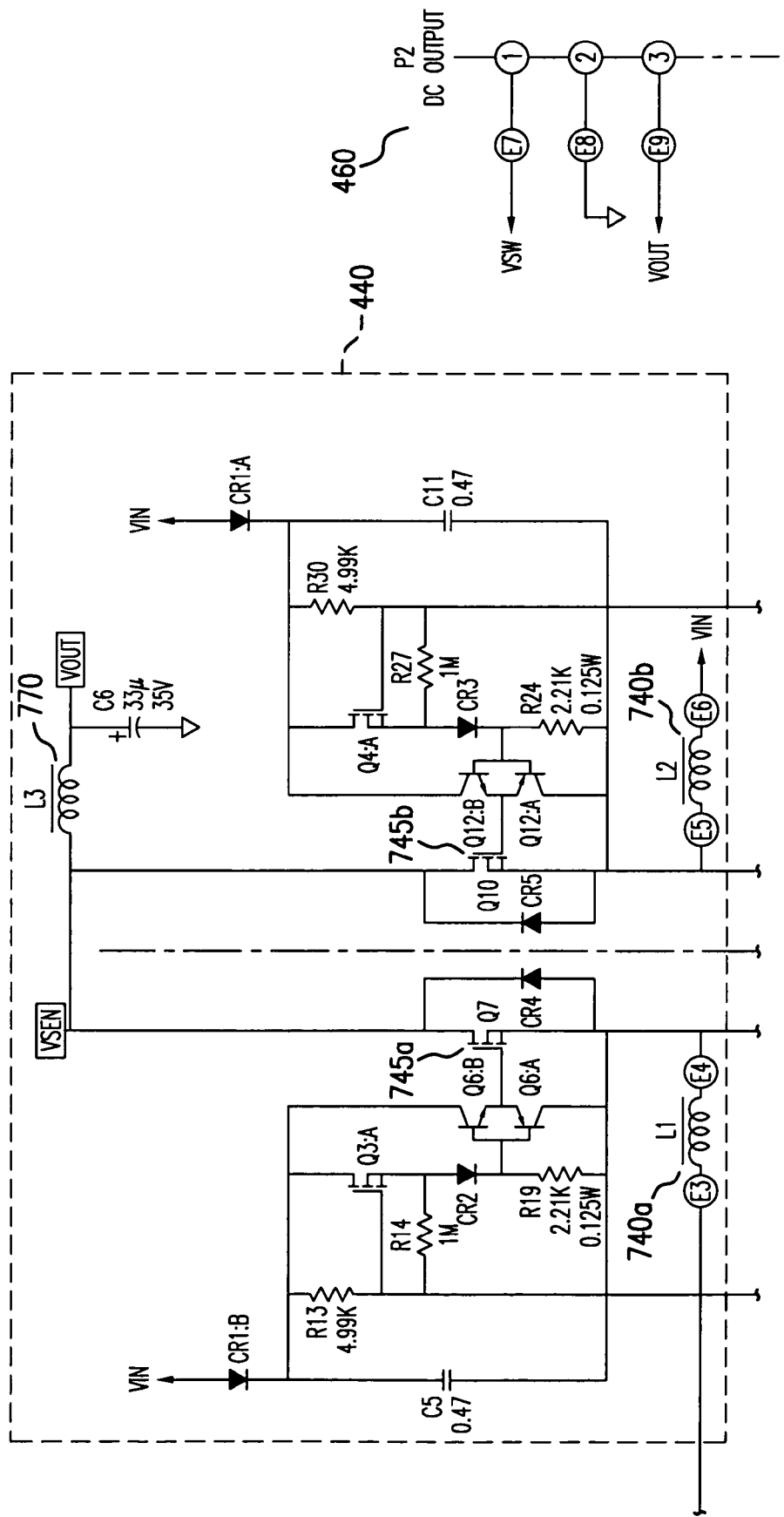
Figure 7C:
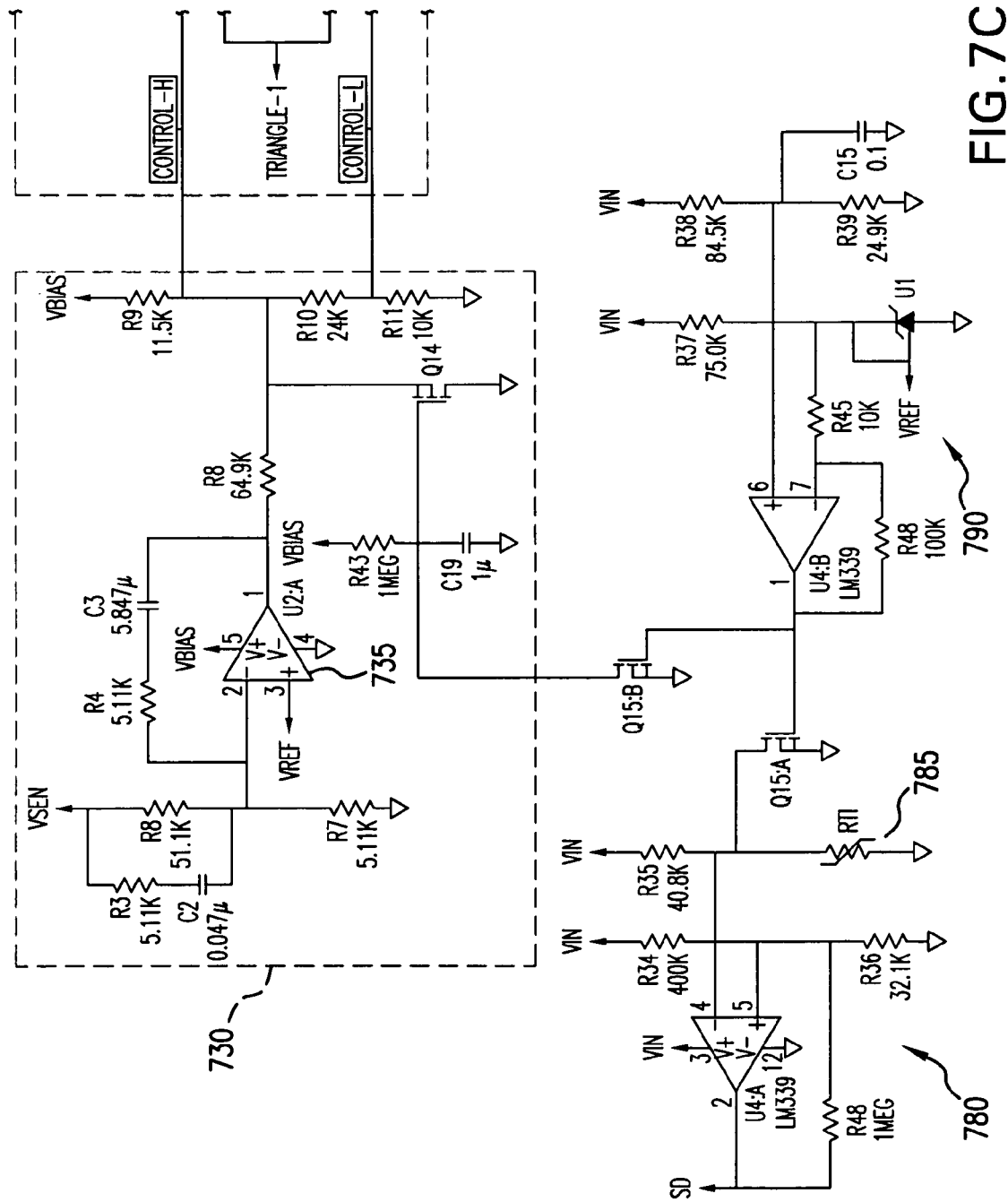
Figure 7D:
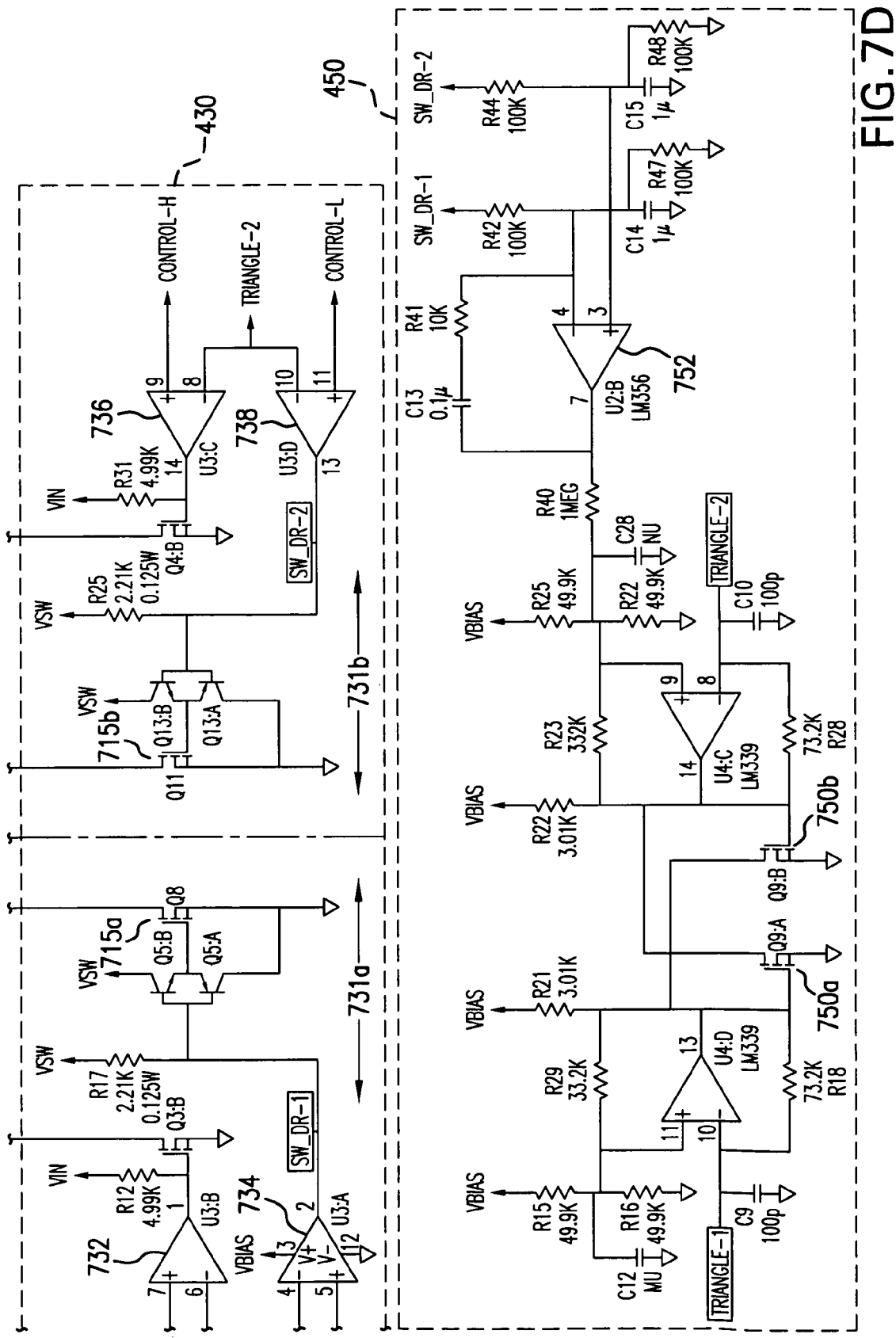

FIG. 7 is a schematic diagram of the a DC input module 110 of the modular power adapter according to an embodiment of the present invention. Referring to FIG. 7, the DC input module 110 includes input circuit 410, regulator circuit 440, control circuit 430, and oscillator circuit 450. Input circuit 410 receives a DC voltage such as 10V from a cigarette lighter, and provides various reference voltages (e.g., $V_{SW}$ and $V_{REF}$) for operation of the DC input module 110. The input circuit 410 may further include fuse (f1) to provide overcurrent protection for the DC input module and thereby protect the modular power adapter and any electronic device coupled thereto. The input voltage $V_{IN}$ is provided to the regulator circuit 440 and reference voltage $V_{SW}$ is provided to the control circuit 430.

In an embodiment of the present invention, the regulator circuit 440 is configured as switched mode power supply with an operating frequency of approximately 100 KHz. Of course, one of ordinary skill would understand that other configurations for a regulator could similarly be used. For example, a linear power supply could be used. The regulator circuit 440 includes a pair of boost inductors 740a and 740b, to which the input voltage $V_{IN}$ is applied. The boost inductors 740a and 740b are used to respectively generate outputs which differ in phase by 180 degrees under the control of the control circuit 430.

Oscillator circuit 450 includes a pair of transistors (750a and 750b) and is used to generate a pair of triangle waves Triangle-1 and Triangle-2. Using these triangle waves, the oscillator circuit 450 sets the pulse width for the control circuit 430.

The control circuit 430 monitors the output voltage (shown as $V_{SEN}$) of regulator 440. The voltage $V_{SEN}$ is filtered and supplied to the inverting input of an operational amplifier 735 of a duty cycle setting circuit 730 of the control circuit 430. The operational amplifier 735 compares the voltage $V_{SEN}$ to a predetermined reference voltage $V_{REF}$ (e.g., 2.5V) which is input to the noninverting input of the amplifier 735. The output of amplifier 735 is used to set the duty cycle for the control circuit 430. The triangle waves supplied by the oscillator circuit 450 are respectively input into the inverting inputs of comparators 732 and 734 on a first side 731a of the control circuit 430 (Triangle-1) and the inverting inputs of comparators 736 and 738 on a second side 731b of the control circuit 430 (Triangle-2). Voltage levels Control H and Control-L are set based on the output of amplifier 735 and respectively input to the non-inverting inputs of comparators 732, 736 and 734, 738. The duty cycle setting circuit 730 is common to both the first side 731a and the second side 731b of the control circuit 430. For ease of understanding, on the second side 731b, the Control H and Control-L signals generated by the duty cycle setting circuit 730 are shown as inputs to the comparators 736, 738.

The output of the comparator 734 (SW_DR_1) on the first side of control circuit 430 and the output of comparator 732 (SW_DR_2) on the second side of control circuit 430 are fed back to the oscillator circuit 450 and compared using comparator 752. The output of comparator 752 is then used to adjust the pulse width of the triangle wave (Triangle-2) provided to the control circuit 430 such that the current on both sides (731a and 731b) of control circuit 430 and thereby regulator 440 are balanced. This ensures that the output voltage $V_{OUT}$ of the regulator 440 is stabilized at a particular voltage level.

The input voltage $V_{IN}$ (e.g., 10V) is applied to boost inductors 740a and 740b. When transistor 715a of the control circuit 430 is switch to an ON state, boost inductor 740a loads. When transistor 715a of the control circuit 430 is switched to an OFF state, the boost inductor 740a acts as a power source and the stored power is applied to transistor 745a until transistor 745a is forward biased thereby producing an increased output voltage as determined by the pulse width. Accordingly, DC input module can for example, take a 12-15 V input voltage and generate a steady state output such as 28V or 32V.

Similarly, when transistor 715b of the control circuit 430 is switch to an ON state, boost inductor 740b loads. When transistor 715b of the control circuit 430 is switched to an OFF state, the boost inductor 740b acts as a power source and the stored power is applied to transistor 745b until transistor 745b is forward biased thereby producing an output which is 180 degrees out of phase with that produced via boost inductor 740a.

The output voltage $V_{OUT}$ and reference voltage $V_{SW}$ are output via output interface jack 460. The DC input module 110 may also include an output filter 770 to reduce ripple voltage.

The DC input module 110 may also be configured with protection circuits 780 and 790. Protection circuit 780 includes a thermistor 785 to monitor the temperature and protects the DC input module from failures related to over-temperature conditions by preventing operation when the temperature reaches a predetermined level. On the other hand, protection circuit 790 protects the DC input module from failures related to undervoltage conditions operation by preventing operation when the input voltage $V_{IN}$ is less that a predetermined reference voltage.

Figure 8:
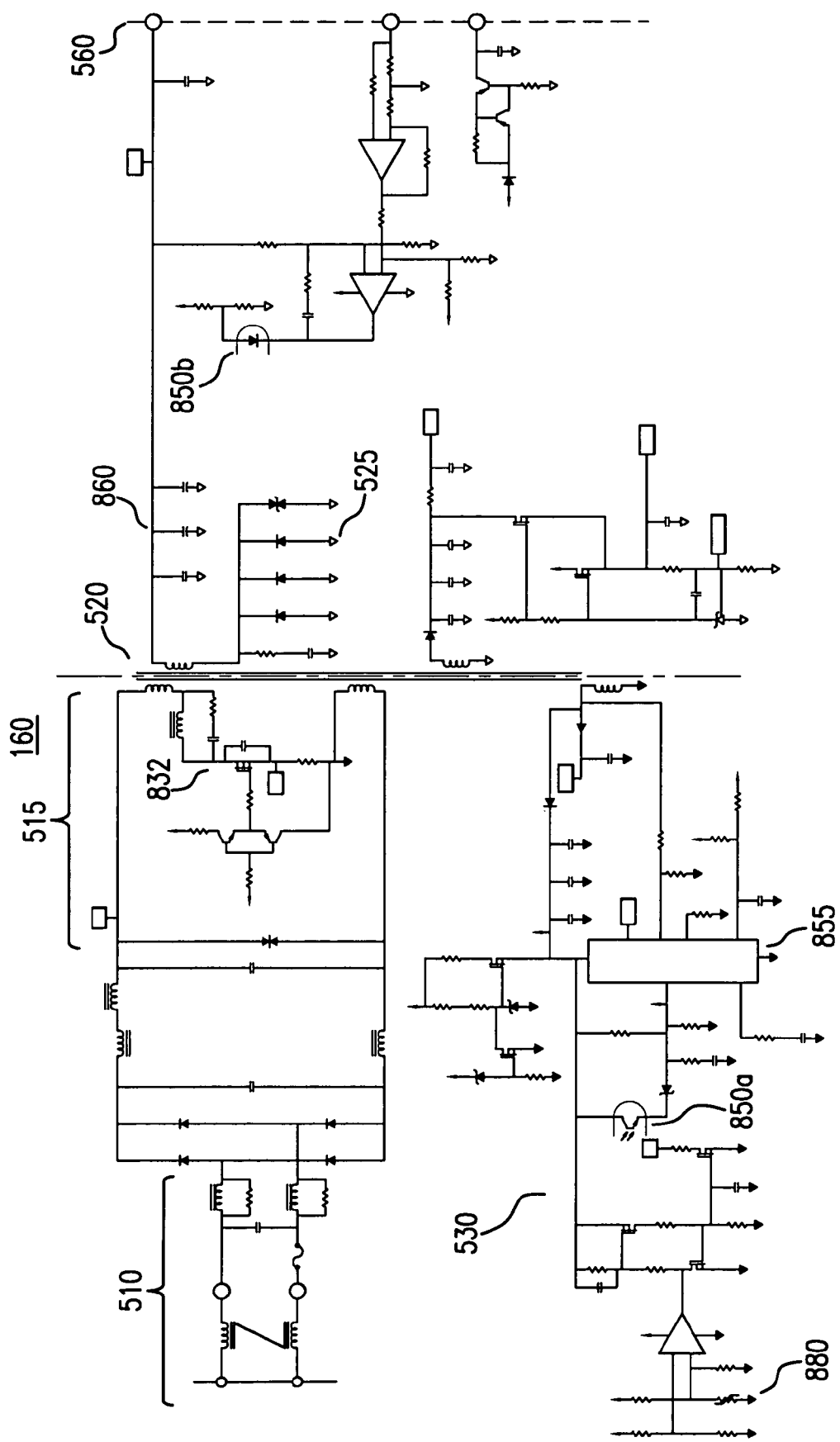
FIGS. 8-8D are schematic diagrams illustrating the AC input module of the modular power adapter according to an embodiment of the present invention.
Figure 8A:
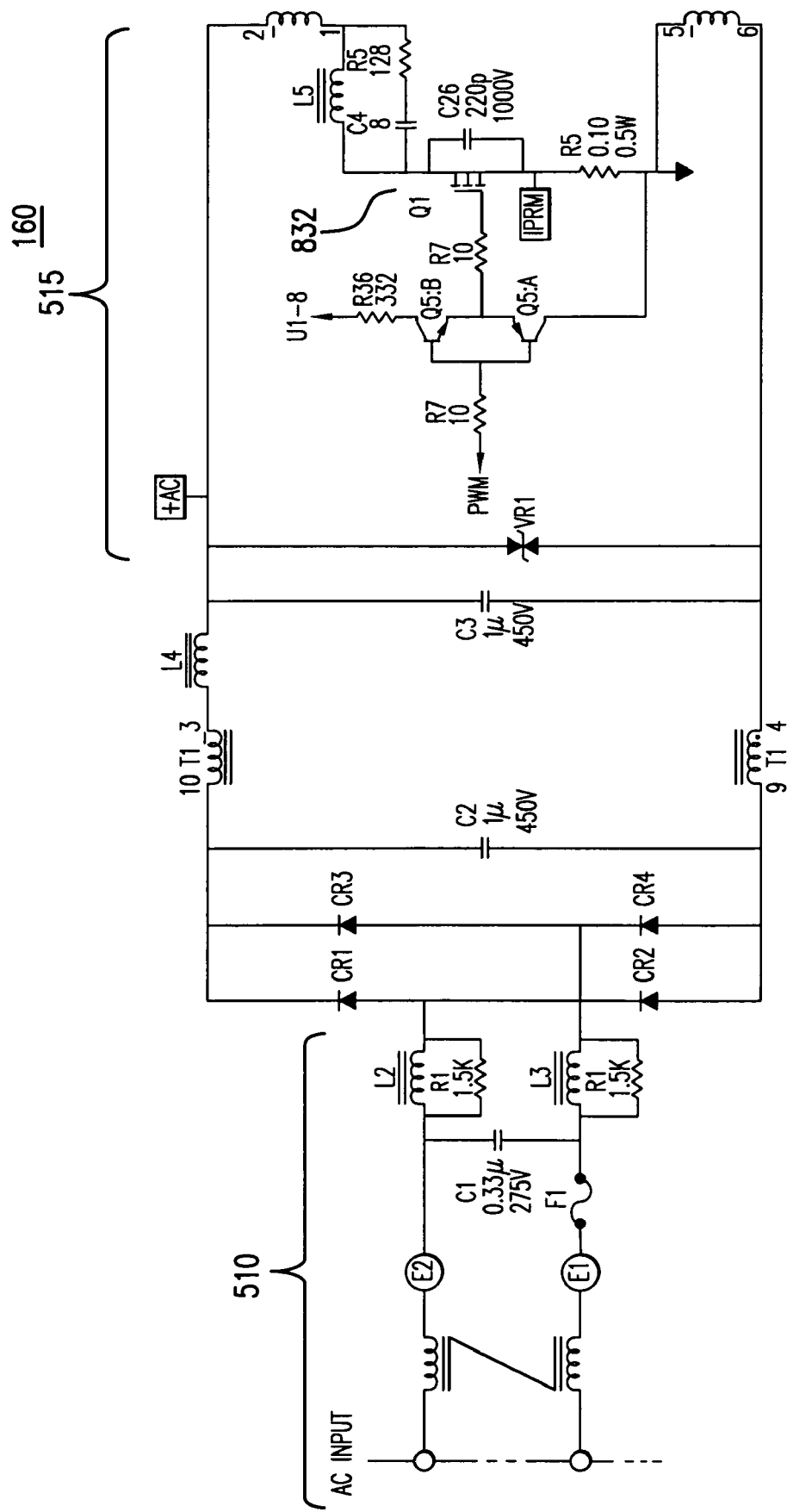
Figure 8B:
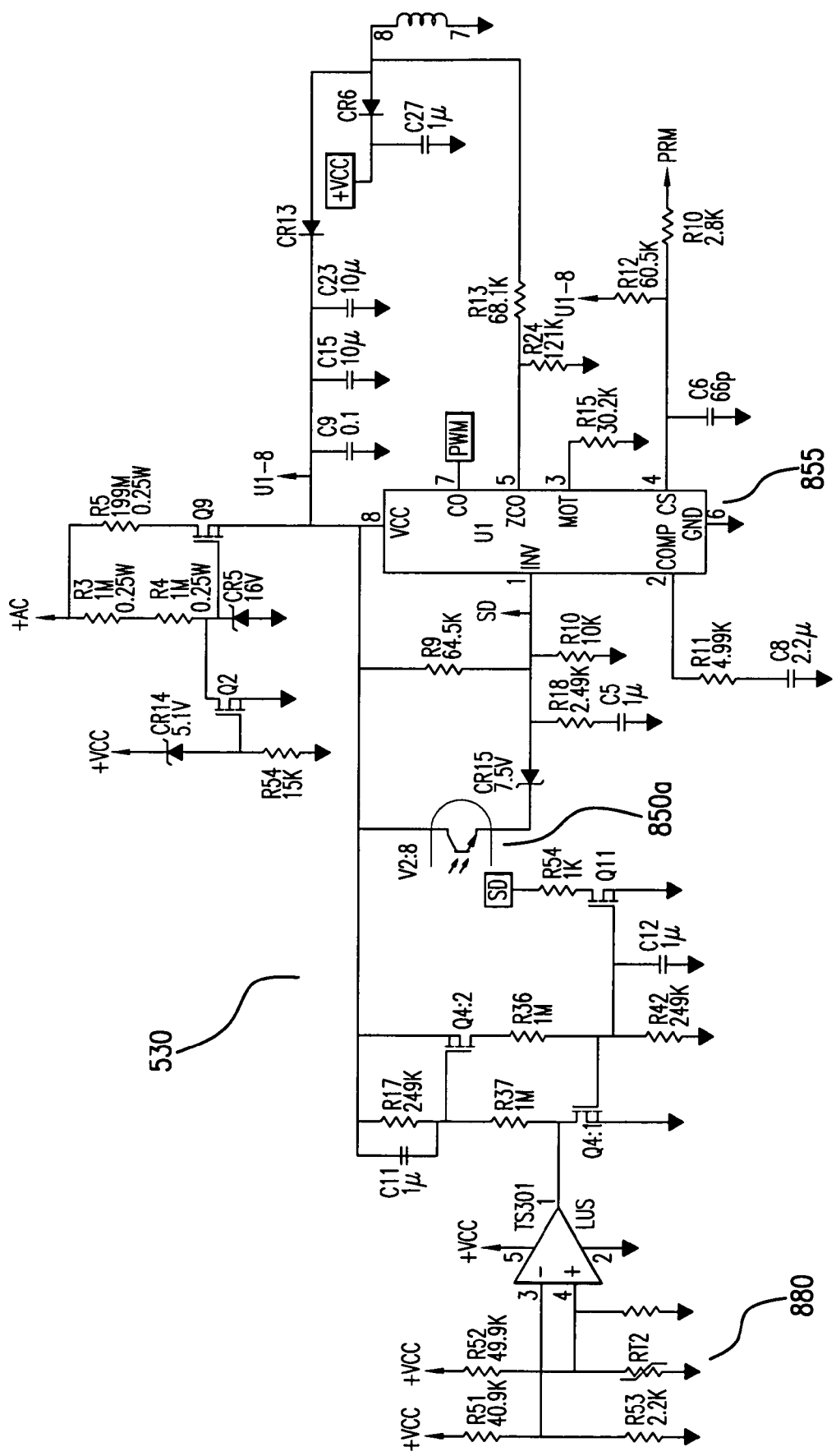
Figure 8C:
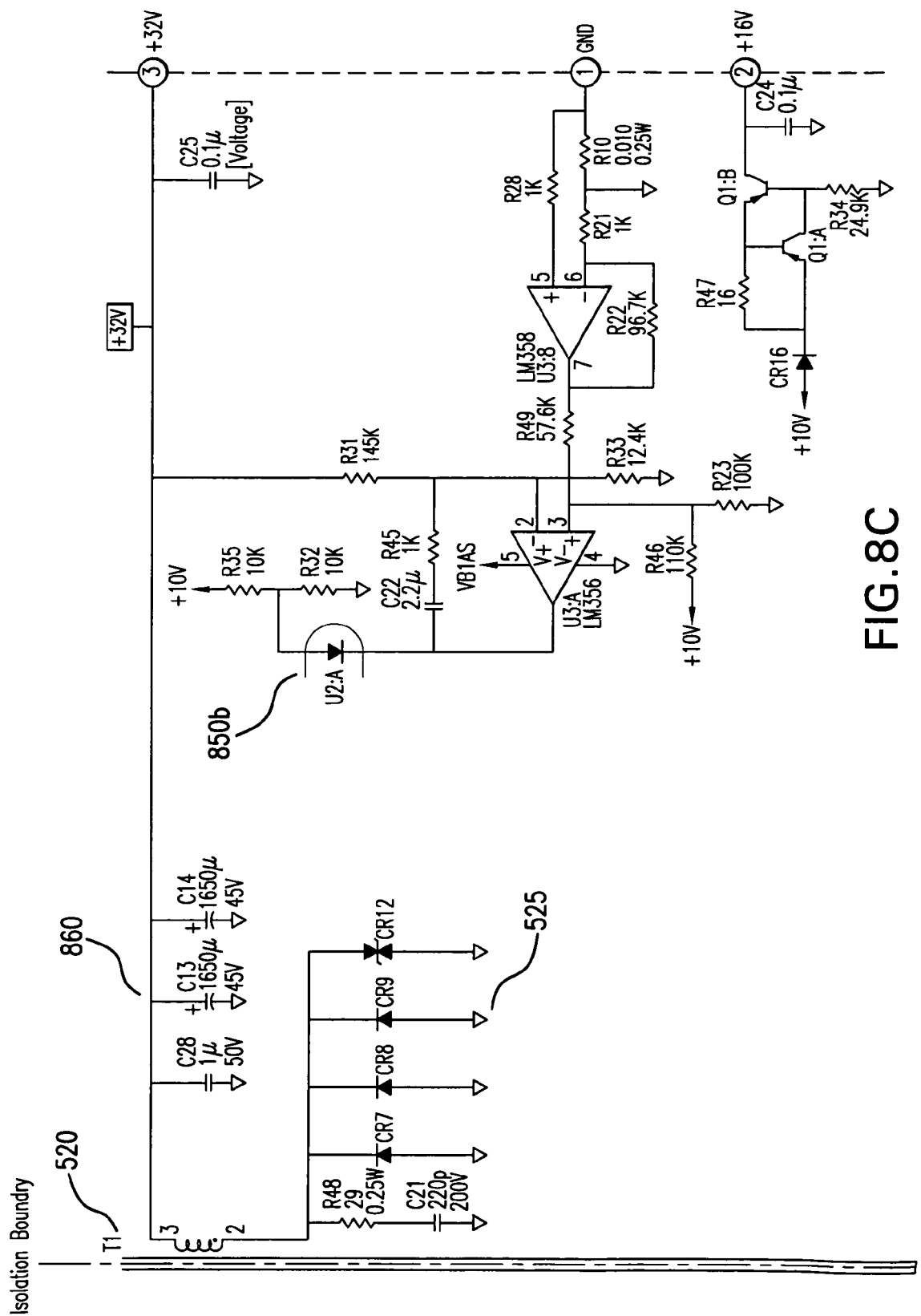
Figure 8D:
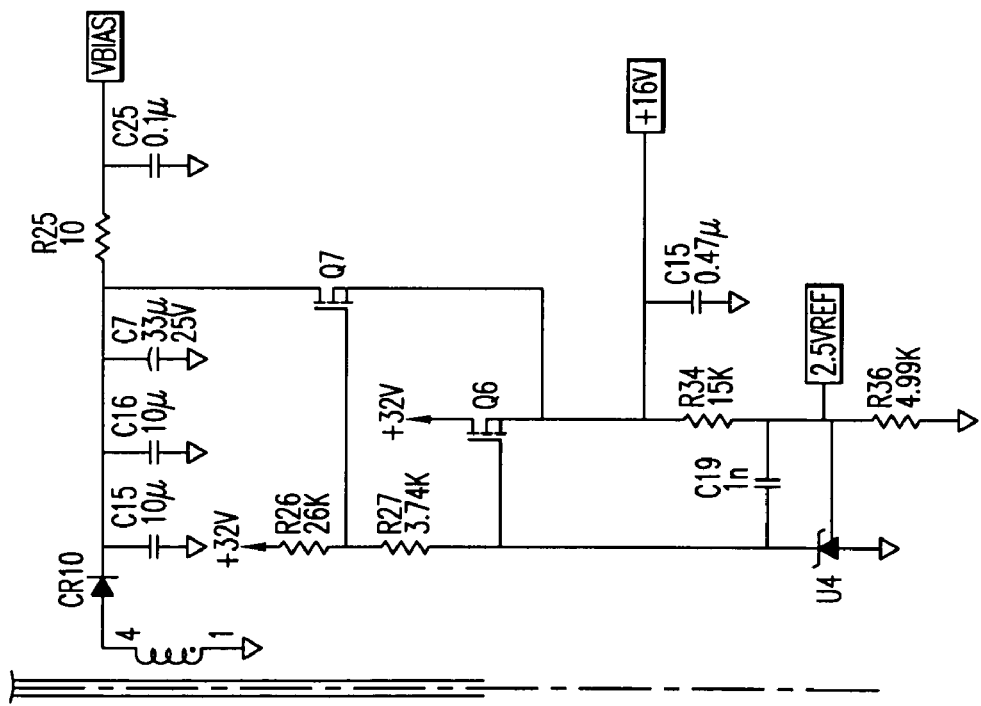

FIG. 8 is a schematic diagram of the AC input module 160 of the modular power adapter according to an embodiment of the present invention. The AC input module 160 includes input circuit 510, conversion circuit 505, switching circuit 515, transformer 520, rectifier circuit 525, and control circuit 530. AC input circuit 510 receives AC power which may be for example 110V or 220V of AC power from a wall outlet. The input power may be filtered for noise reduction. The AC voltage is then supplied to the conversion circuit 505 which is configured as a diode bridge and converts the AC input voltage to an unregulated DC voltage. The unregulated DC voltage is provided to switching circuit 515 which generates an AC voltage based on a pulse width modulation (PWM) signal generated by control circuit 530. When drive transistor 832 of switching circuit 515 is switched to an ON state based on a PWM signal, the AC voltage is provided to rectifier circuit 525 via transformer 520. The rectifier circuit 525 converts the AC voltage to a regulated DC voltage $V_{OUT}$ of approximately 32V. The output voltage $V_{OUT}$ is filtered via output filter circuit 860 and output at output interface jack 560 along with a reference voltage (i.e., $V_{SW}$) of about 10V and ground.

To generate the PWM signal which controls the drive transistor 832, the AC input module 160 may further include an optocoupler (850a and 850b) and integrated circuit (IC) 855 such as the FAN6961 Quasi-resident Pulse Width Modulation Controller. Optocoupler 850a, 850b maintains the isolation boundary between the primary and secondary sides of the transformer 520. Further, optocoupler 850 provides a feedback path to monitor the output voltage and control the pulse width and thereby maintain a stable output voltage.

The AC input module 160 may also be configured with protection circuit 880 which shuts down the AC input module 160 when the temperature reaches a predetermined level.

Figure 9:
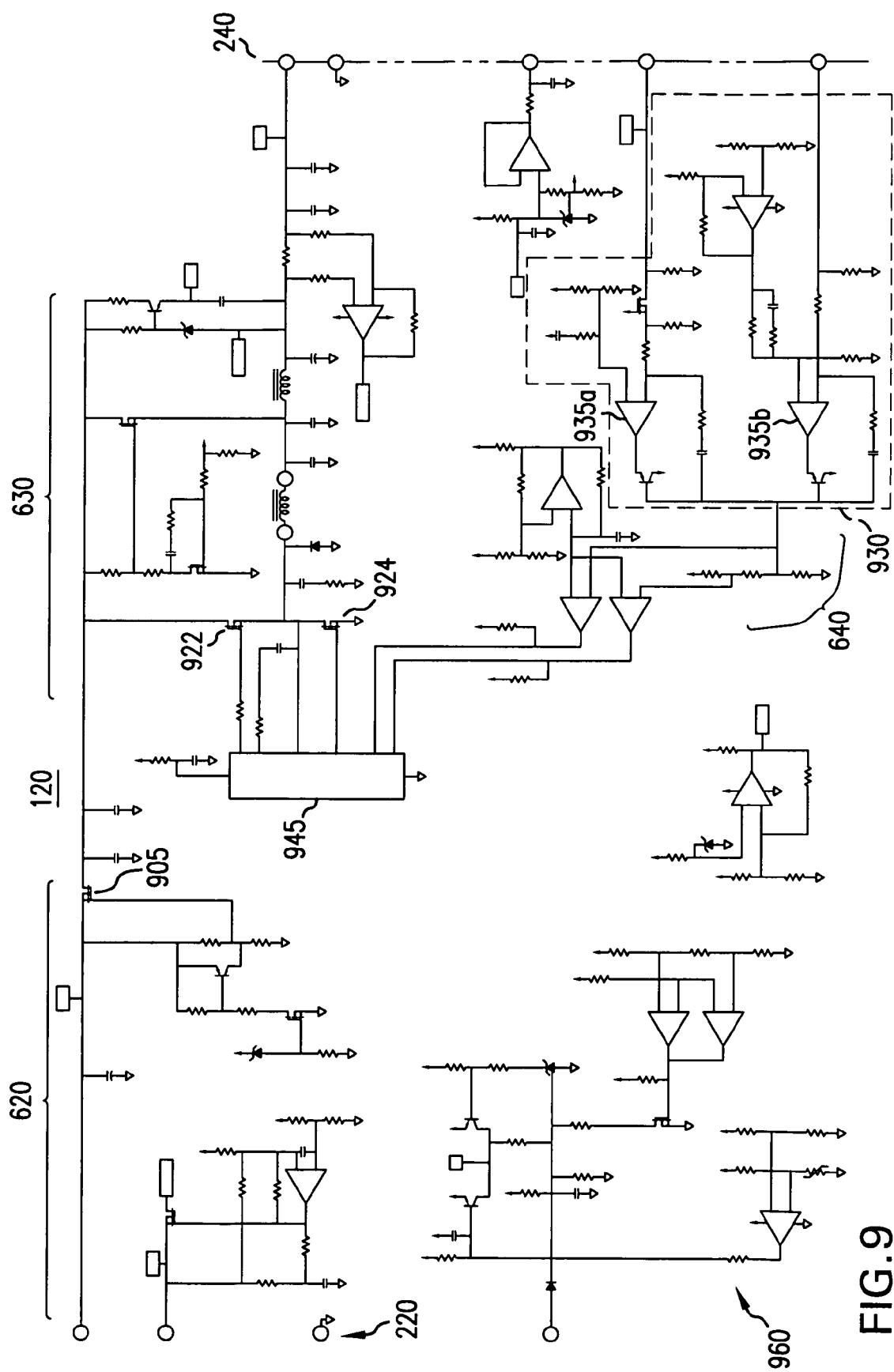
FIGS. 9-9D are schematic diagrams illustrating the DC output module of the modular power adapter according to an embodiment of the present invention.
Figure 9A:
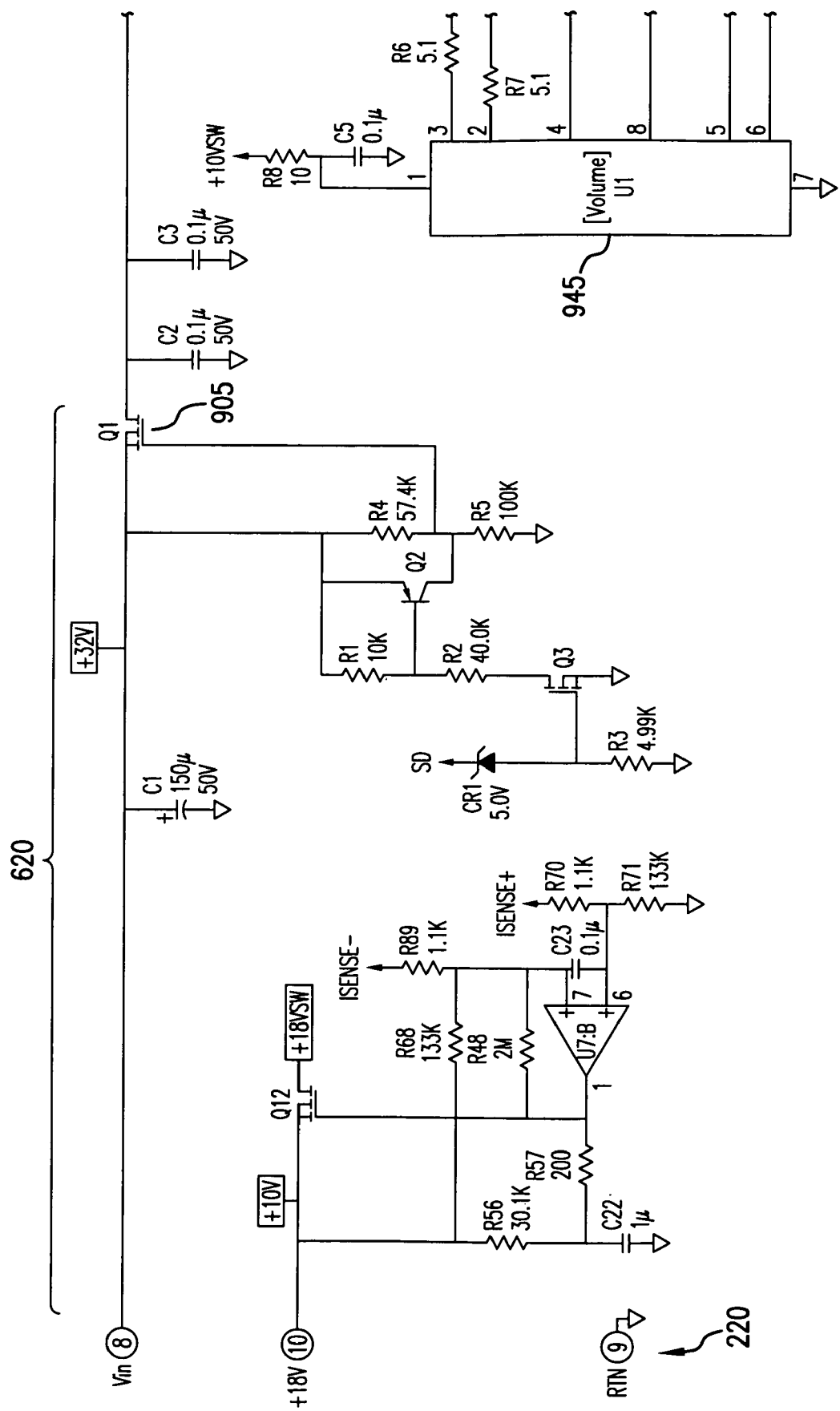
Figure 9B:
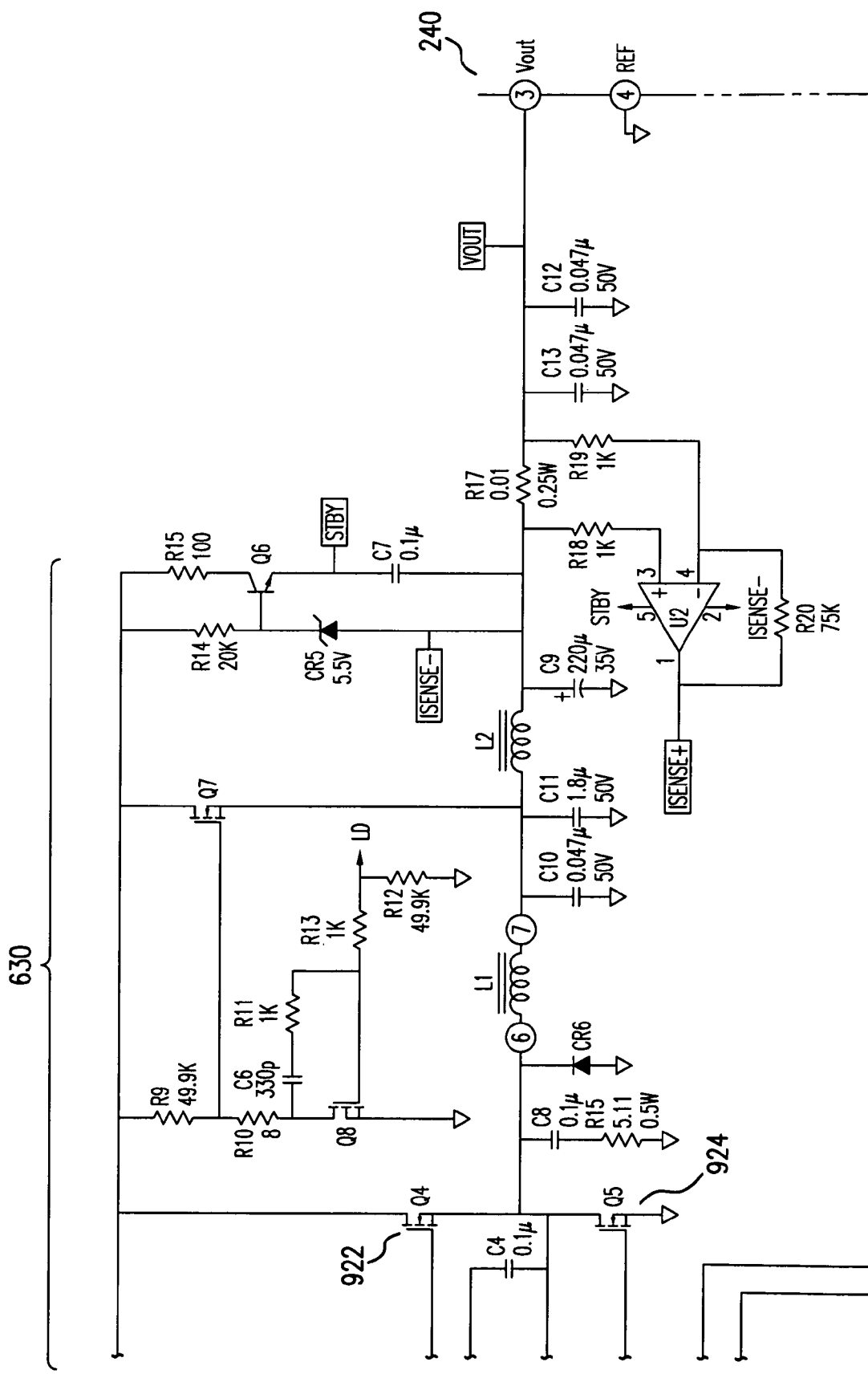
Figure 9C:
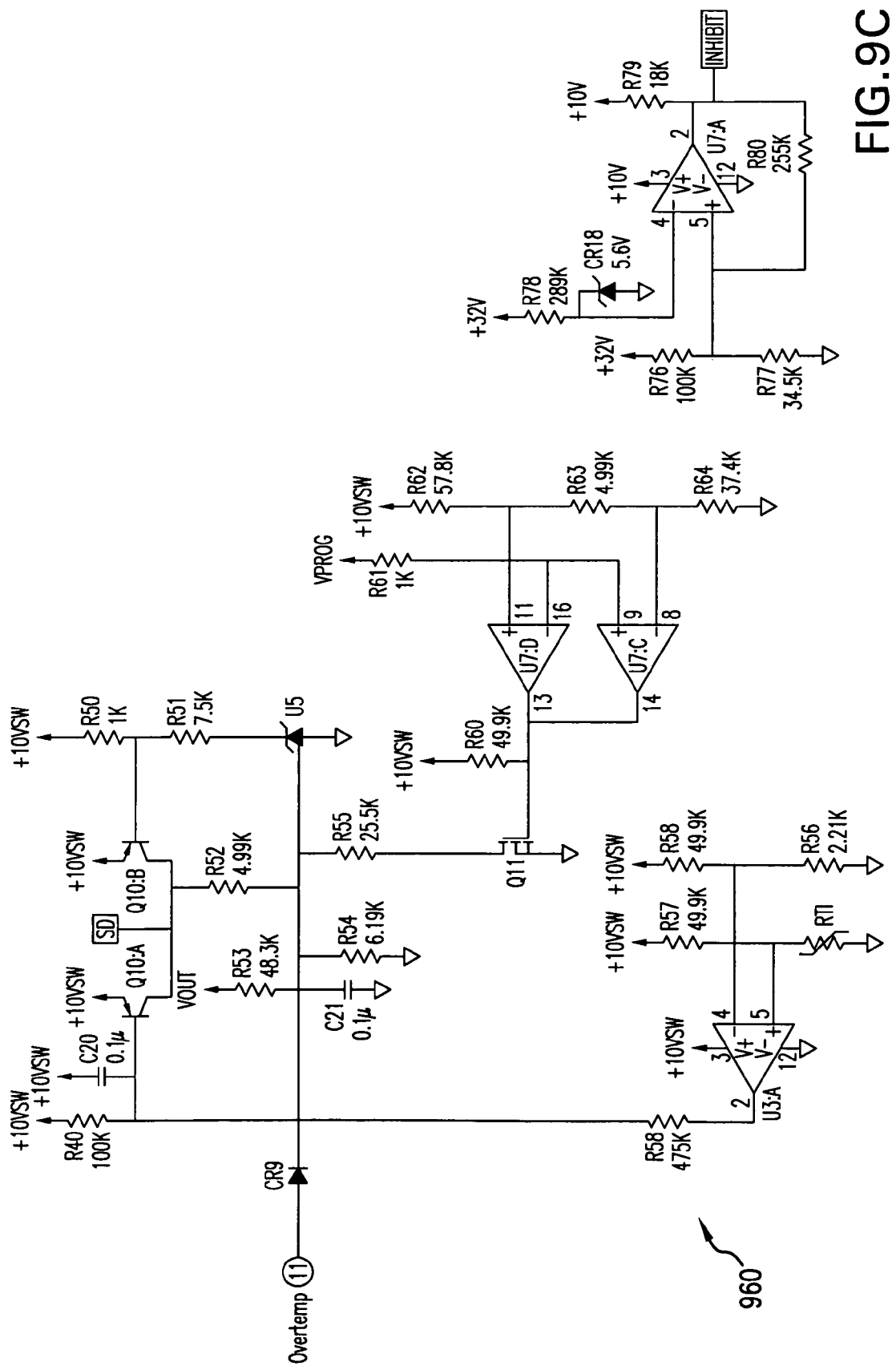
Figure 9D:
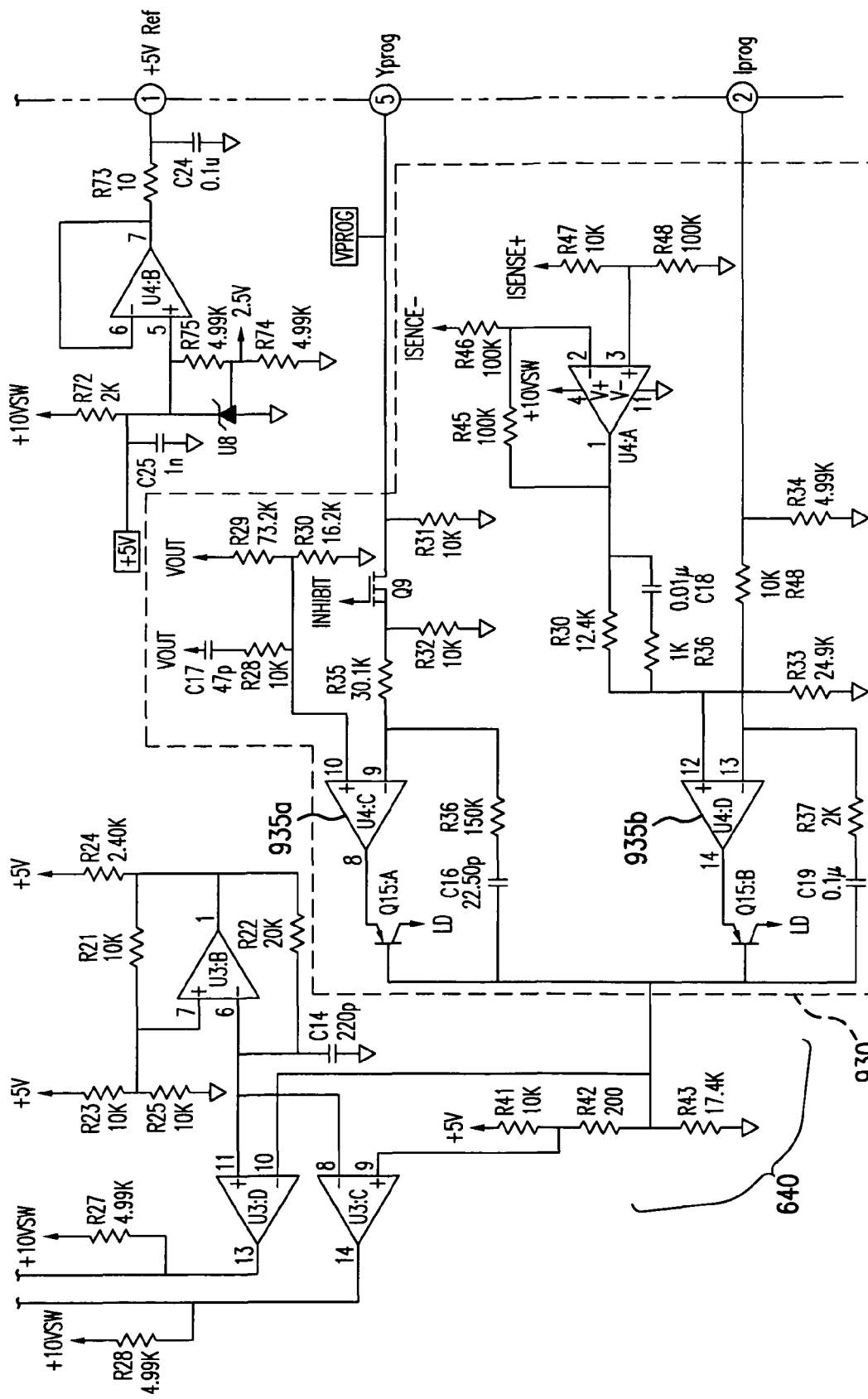

FIG. 9 is a schematic diagram of the a DC output module 120 of the modular power adapter according to an embodiment of the present invention. The DC output module 120 may be detachably coupled to either the DC input module 110 or the AC input module 160 as described above without the need for further modification or additional adapters. In either case, the DC output module 120 receives an input voltage ($V_{IN}$ of the DC output module=$V_{OUT}$ of the input module 110 or 160) and a reference voltage $V_{SW}$ from output interface of the input module coupled thereto. The DC output module 120 includes input interface connector 220, input circuit 620, regulator circuit 630, control circuit 640, and output interface connector 240. The input interface connector 220 couples with the output interface jack of the selected input module (e.g. 460 of FIG. 4 and 560 of FIG. 5) to receive the input voltage $V_{IN}$ and the reference voltage $V_{SW}$ from the input module coupled thereto (i.e., the DC input module 110 or the AC input module 160).

When transistor 905 of input circuit 620 is in an ON state, the input interface circuit 910 delivers input voltage $V_{IN}$ to the regulator circuit 630. As shown in FIG. 9, the regulator circuit may be configured as a synchronous buck converter. Other types of converters could also be used to regulate the power output to an electronic device.

The regulator circuit 630 which may operate at an operating frequency of 130 KHz, for example, adjusts the output to an electronic device using a PWM signal generated by the control circuit 640. The control circuit 640 monitors the output voltage coupled to the output interface connector 240 and generates signals which are used for voltage regulation and for current regulation. In block 930, comparator 935a is used for voltage regulation and monitors the output voltage $V_{OUT}$ and compares $V_{OUT}$ to a reference voltage. This reference voltage may be programmed for example, by components such as resistors which are external to the DC output module 120. Such resistors may be located in a connector adapter ("tip") which interfaces with the electronic device. The output of comparator 935a is used to control IC 945 such as a MIC4100 half bridge driver and the ON/OFF times of transistors 922 and 924. Thus, the regulator circuit 630 is controlled to produces an output voltage $V_{OUT}$ at a level such that the electronic device may be safely operated.

A 5V reference voltage may also be supplied to the DC output module 120 via output interface connector 240 as a source for the program voltage $V_{PROG}$ which is input via the output interface connector 240.

Similarly, the output current is sensed and provided to comparator 935b which compares the output current to a reference to assist in power regulation. $I_{PROG}$ is input via output interface connector 240 and sets a limit as to how much output current may be supplied by the DC output module 120 safely (i.e., before the DC output module 120 is shutdown due to excessive current).

Figure 10:
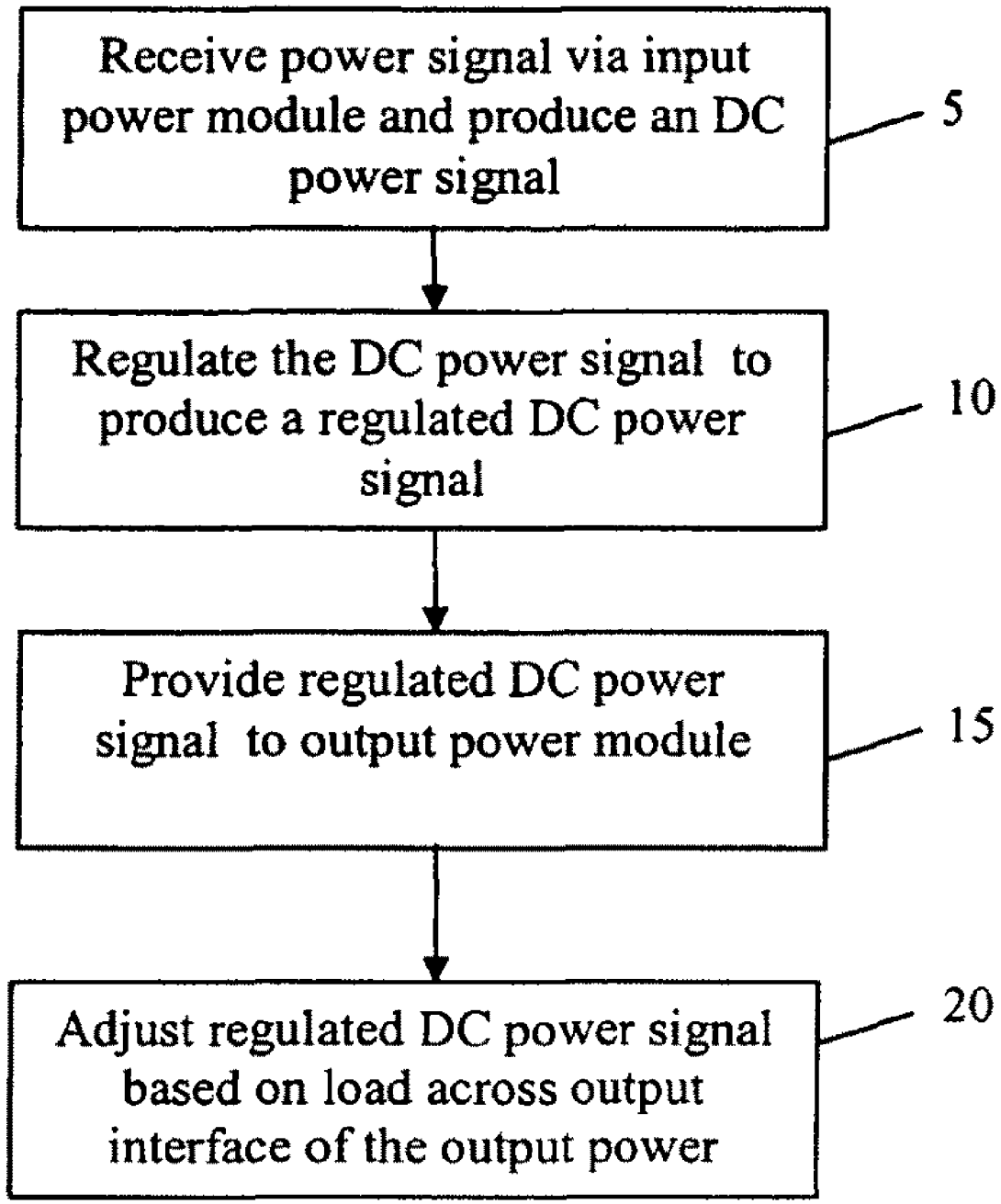
FIG. 10 is a flow diagram illustrating a method for providing a modular power connection according to an embodiment of the present invention.

FIG. 10 is a flow diagram illustrating a method for providing a modular power connection according to an embodiment of the present invention. In step 5, a voltage is received from a power source via an input power module. The input power module may be configured to receive an AC voltage or a DC voltage. The input power module converts the input voltage to DC if an AC voltage is received. In either case, in step 10, the input power module regulates the unregulated DC voltage and outputs the regulated DC voltage. The regulated DC voltage may further be filtered to provide a more stable output voltage. In step 15, the regulated DC voltage is then supplied to an output power module. In step 20, the output power module adjusts the regulated DC voltage to produce an output voltage and outputs the output voltage via an output interface.

Figure 11:
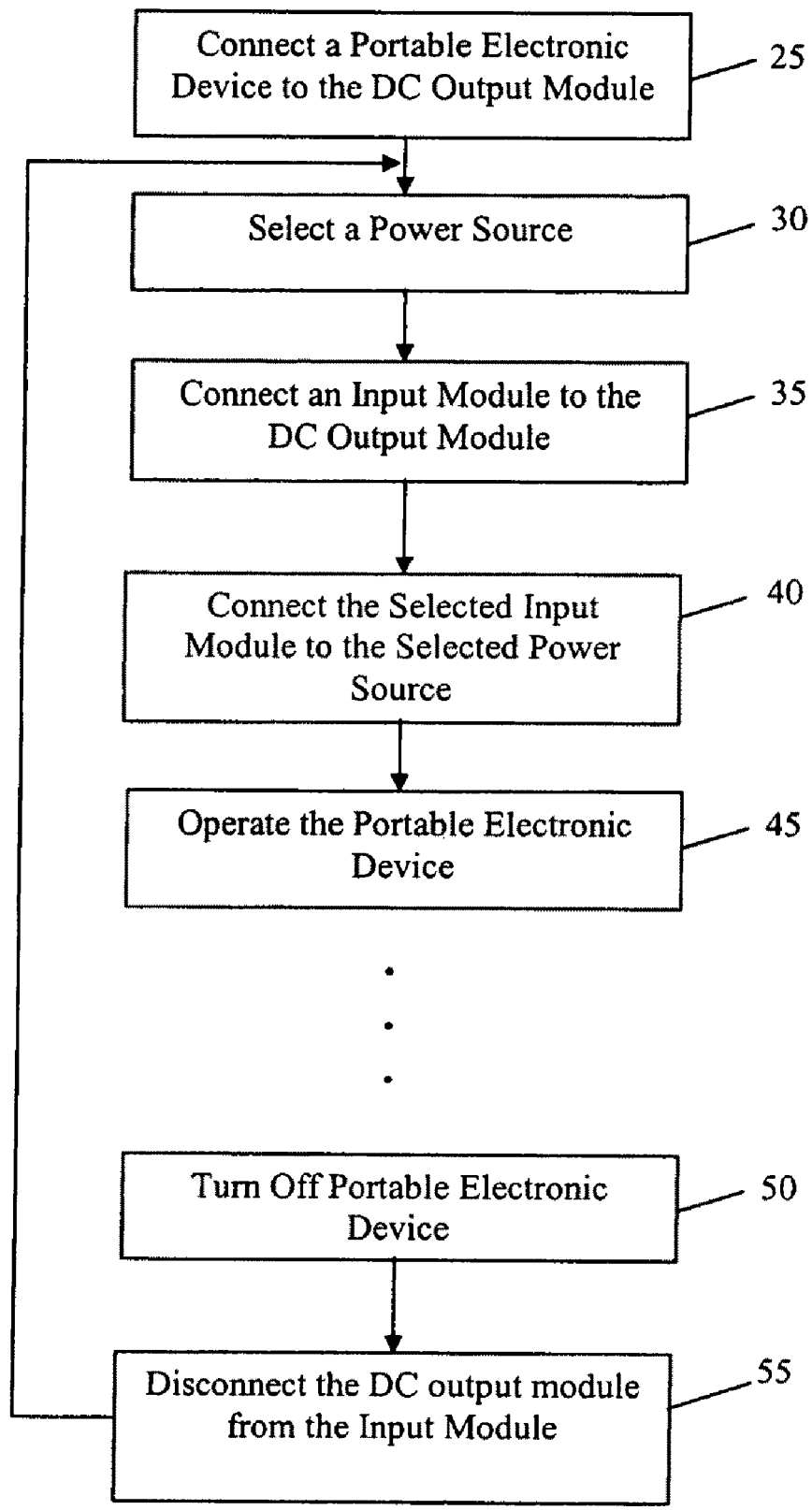
FIG. 11 is a flow diagram illustrating a method for providing a modular power connection according to an embodiment of the present invention.

FIG. 11 is a flow diagram illustrating a method for providing a modular power connection according to an embodiment of the present invention. Referring to FIG. 11, in step 25, the user connects a portable electronic device to the DC output module. In step 30, the user selects a power source and a corresponding input module (DC input module 110 or AC input module 160) to enable operation of the portable electronic device. In step 35, based on the power source selected, the user connects the DC output module to the selected input module by inserting the input interface connector of the DC output module into the output jack of the input module. When an AC source is selected the user connects the AC input module 160 to the DC output module 120. On the other hand when a DC source is selected, the user connects the DC input module 110 to the DC output module 120. In step 40, the user connects the input module to the selected power source. When the AC input module 160 is selected, the user connects power cord 260 to an AC source such as a wall outlet, and when the DC input module 110 is selected, the user connects cigarette lighter adapter to a DC source such as a cigarette lighter socket in a car. In step 45, the user operates the electronic device. In step 50, the user turns off the portable electronic device. In step 55, the user disconnects the DC output module from the input module. When the user is ready to operate the electronic device, the user may repeat steps 30-45 to couple the electronic device to a power source.

Since the AC input module 160 and the DC input module 110 are easily interchangeable a user may quickly switch from an AC power source to a DC power source and vice versa by simply disconnecting the input interface connector 220 of the DC output module 120 from the currently employed input module (110 or 160). The user may then connect the input interface connector 220 of the DC output module 120 to the output jack of the input module for the power source that the user wishes to use. For example, if the user has connected an electronic device to a DC power source, such as a cigarette lighter socket, in a car using the modular power adapter including the DC input module 110, and decides to switch to an AC source, the user disconnects the input interface connector 220 of the DC output module 120 from the output jack of the DC input module 460, leaving the DC input module 110 in the car for later use. Then, with the DC output module 120 still connected to the portable electronic device, the user could then move to a location having an AC source. The user may then insert the input interface connector 220 of the DC output module into the output jack 560 of the AC input module 160. An AC power cord 260 is coupled to the AC input module and plugged into an outlet for the AC source thereby enabling operation of the portable electronic device.

While the description above may refer to particular embodiments of the present invention, it will be understood that many alternatives, modifications and variations may be made without departing from the spirit thereof. The accompanying claims are intended to embrace such alternatives, modifications and variations as would fall within the true scope and spirit of the present invention. The presently disclosed embodiments are therefore to be considered in all respects as illustrative and not restrictive, the scope of the invention by the claims, rather than the foregoing description, and all changes which come within the meaning and range of equivalency of the claims are therefore intended to be embraced therein.

What is claimed is:

1. A modular power adapter system comprising:
a direct current (DC) input module to receive a DC voltage and generate a first DC output voltage, wherein first circuitry for the DC input module is disposed in a first housing;
an alternating current (AC) input module to receive an AC voltage and generate a second DC output voltage, wherein second circuitry for the AC input module is disposed in a second housing; and
a DC output module which detachably couples to either the DC input module or the AC input module, and when coupled to the DC input module converts the first DC output voltage to a DC operational voltage for an electronic device, and when coupled to the AC input module converts the second DC output voltage to the DC operational voltage for the electronic device, wherein third circuitry for the DC output module is disposed in a third housing which is separate from the first housing and from the second housing.

2. The modular power adapter system of claim 1, wherein the DC voltage is supplied via a cigarette lighter socket of an automobile.

3. The modular power adapter system of claim 1, wherein the AC voltage is supplied via a wall outlet.

4. The modular power adapter system of claim 1, wherein the first DC output voltage is regulated.

5. The modular power adapter system of claim 1, wherein the second DC output voltage is regulated.

6. The modular power adapter system of claim 1, wherein the first DC output voltage is equal to the second DC output voltage.

7. A method for using a modular power adapter to provide power to a portable electronic device, the method comprising:
connecting the portable electronic device to a DC output module;
selecting a power source and a corresponding input module, the corresponding input module being selected from a plurality of input modules, at least one of which receives DC power and at least one of which receives AC power;
connecting the corresponding input module to the DC output module; and
connecting the selected power source to the corresponding input module,
wherein the respective circuitry for the DC output module and each of the plurality of input modules is disposed in respective housings which are separate from each other, and the DC output module is configured such that the DC output module may be coupled to one and only one of the plurality of input modules at a time.

8. A modular power adapter system comprising:
a direct current (DC) input module to receive a DC voltage and generate a first DC output voltage, the DC input module including a first output connector at which the first DC output voltage is provided;
an alternating current (AC) input module to receive an AC voltage and generate a second DC output voltage, the AC input module including a second output connector at which the second DC output voltage is provided; and
a DC output module which detachably couples to either the DC input module or the AC input module, and when coupled to the DC input module converts the first DC output voltage to a DC operational voltage for the electronic device, and when coupled to the AC input module converts the second DC output voltage to the DC operational voltage for the electronic device, the DC output module being coupled to an interface connector which is configured to detachably mate, one at a time, with the first output connector and with the second output connector.

9. The modular power adapter system of claim 8, wherein the interface connector is disposed on a first end of a cable, the cable having a second end which terminates at the DC output module.

10. The modular power adapter system of claim 8, wherein
the DC input module generates a first reference voltage in addition to the first DC output voltage;
the AC input module generates a second reference voltage in addition to the second DC output voltage; and
the DC output module, when coupled to the DC input module, utilizes the first reference voltage to convert the first DC output voltage to the DC operational voltage, and when coupled to the AC input module, utilizes the second reference voltage to convert the second DC output voltage to the DC operational voltage.

11. The modular power adapter system of claim 10, wherein the first reference voltage is equal to the second reference voltage.

12. The modular power adapter system of claim 11, wherein the first DC output voltage is equal to the second DC output voltage, and each of the first and second DC output voltages are different than each of the first and second reference voltages.

13. The modular power adapter system of claim 12, wherein each of the first and second DC output voltages is about 32 V and each of the first and second reference voltages is about 10 V.

* * * * *

(12) EX PARTE REEXAMINATION CERTIFICATE (10511th)

United States Patent
Lanni

(10) Number: US 8,213,204 C1
(45) Certificate Issued: Mar. 2, 2015

(54) MODULAR POWER ADAPTER

(75) Inventor: Thomas W. Lanni, Laguna Niguel, CA (US)

(73) Assignee: Comarco Wireless Technologies, Inc., Lake Forest, CA (US)

Reexamination Request:
No. 90/013,229, May 5, 2014

Reexamination Certificate for:
Patent No.: 8,213,204
Issued: Jul. 3, 2012
Appl. No.: 12/384,155
Filed: Apr. 1, 2009

(51) Int. Cl.
*H02M 1/10* (2006.01)
*H01R 13/44* (2006.01)
*H02M 7/00* (2006.01)
*H02M 3/155* (2006.01)

(52) U.S. Cl.
CPC ............. *H02M 1/10* (2013.01); *H02M 7/003* (2013.01); *H02M 3/155* (2013.01)

USPC .......................................... 363/142; 439/131

(58) Field of Classification Search
None
See application file for complete search history.

(56) References Cited

To view the complete listing of prior art documents cited during the proceeding for Reexamination Control Number 90/013,229, please refer to the USPTO's public Patent Application Information Retrieval (PAIR) system under the Display References tab.

*Primary Examiner* — Salman Ahmed

(57) ABSTRACT

A modular power adapter and method for using the same which increases the ease of a user's travel with portable electronic devices. The modular power adapter includes an output module which may be interchangeably and detachably coupled to DC input module or an AC input module. The output module and the input module are provided in separate housing structures thereby effectively spreading the heat dissipated from the modular power adapter.

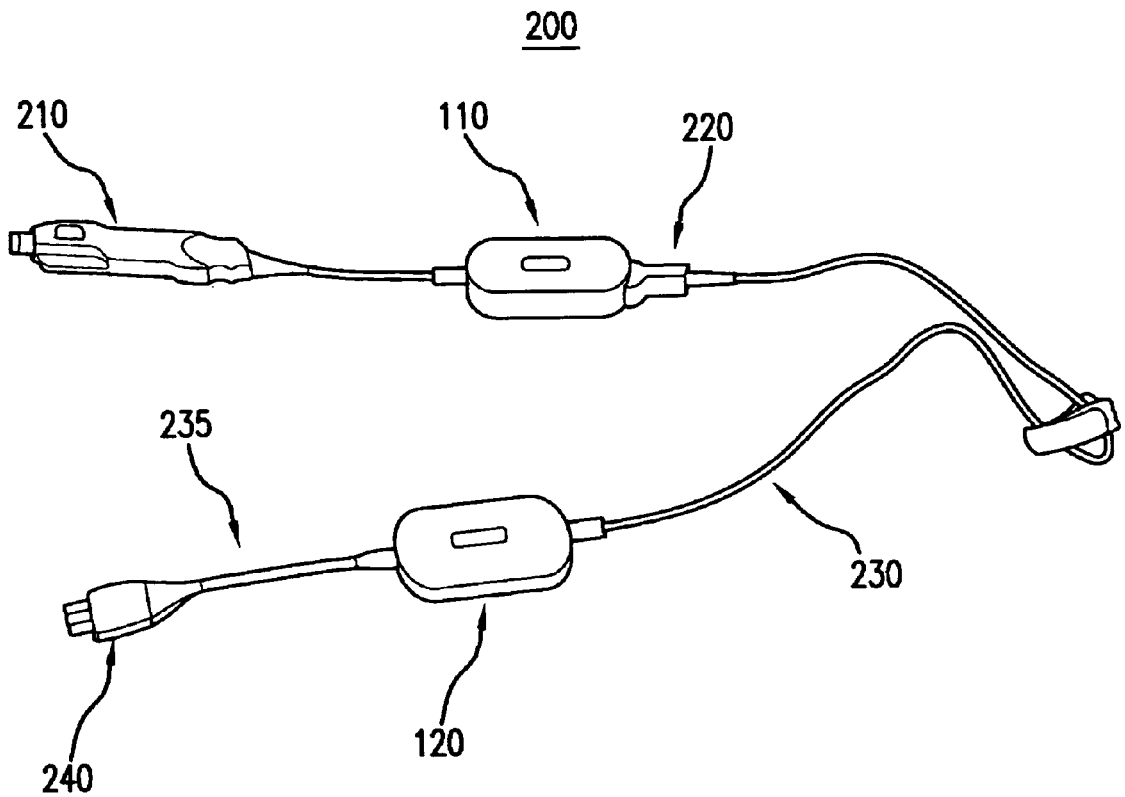

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-8 are cancelled.

New claims 14-18 are added and determined to be patentable.

Claims 9-13 were not reexamined.

*14. A modular power adapter system comprising:*

*a direct current (DC) input module to receive a DC voltage and generate a first DC output voltage, wherein first circuitry for the DC input module is disposed in a first housing;*

*wherein the first circuitry in the DC input module receives the DC voltage and modifies the DC voltage to create the first DC output voltage, which is different than the DC voltage;*

*an alternating current (AC) input module to receive an AC voltage and generate a second DC output voltage, wherein second circuitry for the AC input module is disposed in a second housing; and*

*a DC output module which detachably couples to either the DC input module or the AC input module, and when coupled to the DC input module converts the first DC output voltage to a DC operational voltage for an electronic device, and when coupled to the AC input module converts the second DC output voltage to the DC operational voltage for the electronic device, wherein third circuitry for the DC output module is disposed in a third housing which is separate from the first housing and from the second housing.*

*15. The modular power adapter system of claim 14, wherein the first circuitry includes a protection circuit that monitors the DC voltage and prevents operation when the DC voltage is less than a predetermined reference voltage.*

*16. A modular power adapter system comprising:*

*a direct current (DC) input module to receive a DC voltage and generate a first DC output voltage, wherein first circuitry for the DC input module is disposed in a first housing;*

*wherein the first circuitry comprises a control circuit and an oscillator circuit;*

*an alternating current (AC) input module to receive an AC voltage and generate a second DC output voltage, wherein second circuitry for the AC input module is disposed in a second housing; and*

*a DC output module which detachably couples to either the DC input module or the AC input module, and when coupled to the DC input module converts the first DC output voltage to a DC operational voltage for an electronic device, and when coupled to the AC input module converts the second DC output voltage to the DC operational voltage for the electronic device, wherein third circuitry for the DC output module is disposed in a third housing which is separate from the first housing and from the second housing.*

*17. A modular power adapter system comprising:*

*a direct current (DC) input module to receive a DC voltage and generate a first DC output voltage, wherein first circuitry for the DC input module is disposed in a first housing;*

*an alternating current (AC) input module to receive an AC voltage and generate a second DC output voltage, wherein second circuitry for the AC input module is disposed in a second housing; and*

*a DC output module which detachably couples to either the DC input module or the AC input module, and when coupled to the DC input module converts the first DC output voltage to a DC operational voltage for an electronic device, and when coupled to the AC input module converts the second DC output voltage to the DC operational voltage for the electronic device, wherein third circuitry for the DC output module is disposed in a third housing which is separate from the first housing and from the second housing;*

*wherein the first circuitry comprises:*

*an input circuit that receives the DC voltage and outputs an intermediate DC voltage;*

*a regulator circuit that receives the intermediate DC voltage from the input circuit and regulates the intermediate DC output voltage to generate the first DC output voltage; and*

*a control circuit that monitors the first DC output voltage, the control circuit interfacing with an oscillator circuit, and communicating with the regulator circuit to control the regulator circuit.*

*18. The modular power adapter system of claim 17, wherein the input circuit comprises a fuse.*

* * * * *